United States Patent [19]
Alt et al.

[11] Patent Number: 5,969,904
[45] Date of Patent: Oct. 19, 1999

[54] AIR BEARING SLIDER AND HEAD GIMBAL ASSEMBLY

[75] Inventors: Robert A. Alt, Longmont; Bruce D. Emo, Niwot; Gary F. Kelsic, Longmont, all of Colo.

[73] Assignee: Mobile Storage Technology, Inc., Boulder, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/700,139

[22] Filed: Aug. 20, 1996

Related U.S. Application Data

[60] Continuation of application No. 08/423,587, Apr. 17, 1995, abandoned, which is a division of application No. 08/271,398, Jul. 6, 1994, abandoned.

[51] Int. Cl.⁶ .............................. G11B 5/58; G11B 21/20
[52] U.S. Cl. ............................................................ 360/104
[58] Field of Search .................................... 360/102, 103, 360/104, 105, 109

[56] References Cited

U.S. PATENT DOCUMENTS

| | | | |
|---|---|---|---|
| 4,761,699 | 8/1988 | Ainslie et al. | 360/103 |
| 4,876,623 | 10/1989 | Takekado | 360/104 |
| 4,903,156 | 2/1990 | Hayashi et al. | 360/104 |
| 4,991,045 | 2/1991 | Oberg | 306/104 |
| 5,008,768 | 4/1991 | Carlson et al. | 360/104 |
| 5,063,464 | 11/1991 | Astheimer et al. | 360/104 |
| 5,172,286 | 12/1992 | Jurgenson | 360/104 |
| 5,185,683 | 2/1993 | Oberg et al. | 306/104 |
| 5,187,625 | 2/1993 | Blaeser et al. | 306/104 |
| 5,198,945 | 3/1993 | Blaeser et al. | 360/104 |
| 5,208,712 | 5/1993 | Hatch et al. | 360/98.01 |
| 5,223,997 | 6/1993 | Uemura et al. | 360/104 |
| 5,225,950 | 7/1993 | Crane | 360/104 |
| 5,237,472 | 8/1993 | Morehouse et al. | 360/105 |
| 5,282,102 | 1/1994 | Christianson | 360/104 |
| 5,282,103 | 1/1994 | Hatch et al. | 360/104 |
| 5,289,325 | 2/1994 | Morehouse et al. | 306/104 |
| 5,291,359 | 3/1994 | Wolter | 306/104 |
| 5,299,080 | 3/1994 | Mizuno et al. | 360/103 |
| 5,331,489 | 7/1994 | Johnson et al. | 360/104 |
| 5,428,490 | 6/1995 | Hagen | 360/104 |
| 5,473,487 | 12/1995 | Nagase | 360/104 |

FOREIGN PATENT DOCUMENTS

| | | |
|---|---|---|
| 3-52176 | 7/1989 | Japan. |
| 3-189976 | 8/1991 | Japan. |
| 5-234295 | 9/1993 | Japan. |

OTHER PUBLICATIONS

Hutchinson Technology, "Type 16 Suspension Assembly Characteristics Summary" Jun. 20, 1991.
Search Results comprising 71 pages.

*Primary Examiner*—David L. Ometz
*Attorney, Agent, or Firm*—Skjerven, Morrill, MacPherson, Franklin & Friel; David W. Heid

[57] ABSTRACT

In accordance with this invention, an air bearing slider has a mounting side which has a relieved portion formed by a stepped-contour or a tapered contour. The stepped-contour includes an adherent surface adjacent the rear face of the air bearing slider and a notch surface adjacent the front face of the air bearing slider. The notch surface is closer to the air bearing surface than the adherent surface. The tapered contour includes an adherent surface adjacent the rear face and a taper surface adjacent the front face such that the taper surface is at an angle to the adherent surface. The clearance provided by the relieved portion eliminates interference between the air bearing slider and the load beam surround portions which support the air bearing slider. Depth of the relieved portion of the air bearing slider can be altered easily during grinding for customized multiple drive designs without major retooling effort. To eliminate any potential contact between the corners of the adherent surface of the air bearing slider and the load beam surround portions, cutouts and/or etched regions are provided to the load beam surround portions adjacent to the adherent surface. The relieved portion of the air bearing slider can overlap the load beam surround portions such that the overlaps limit angular excursion of the air bearing slider when the air bearing slider is unloaded from the disk.

7 Claims, 20 Drawing Sheets

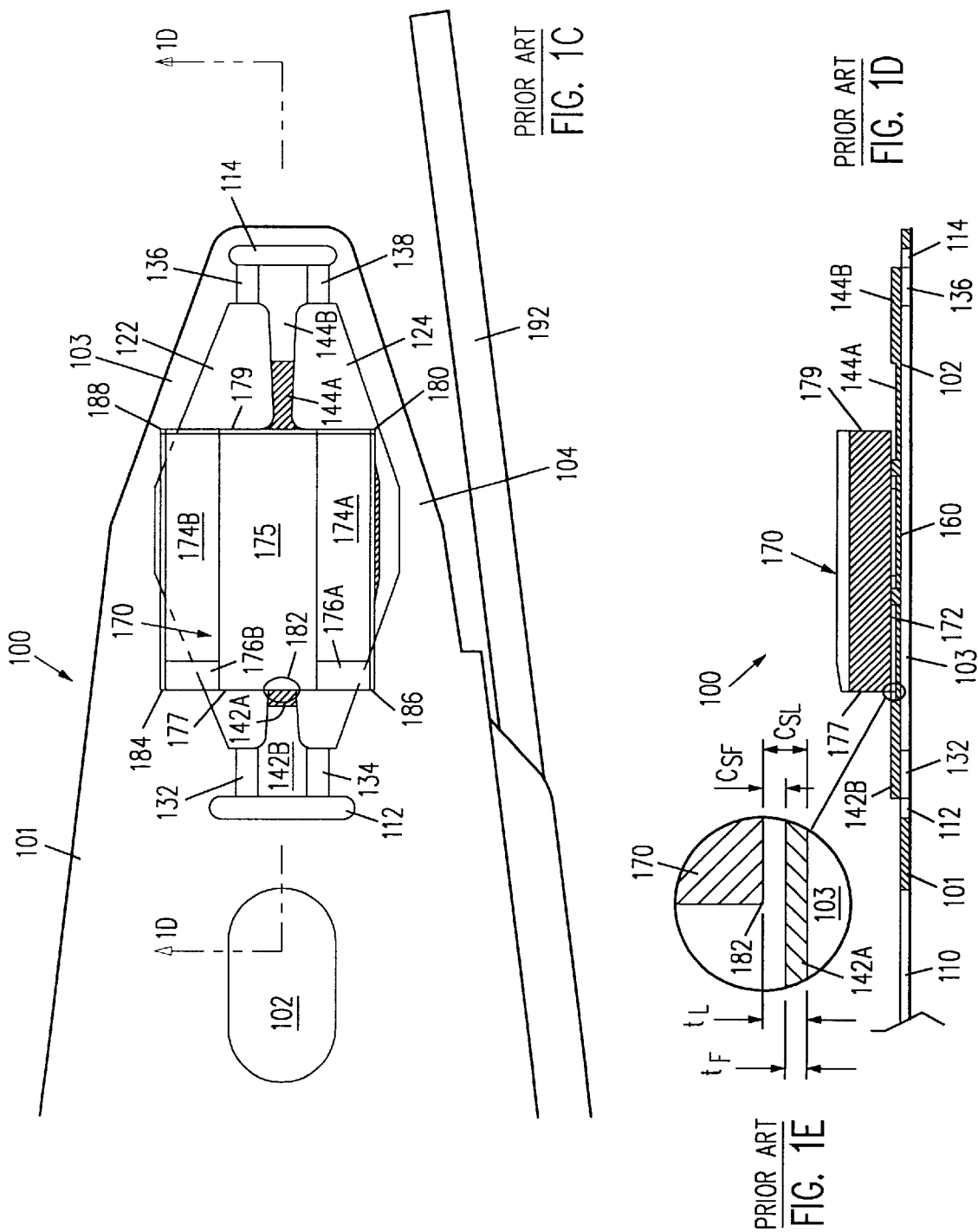

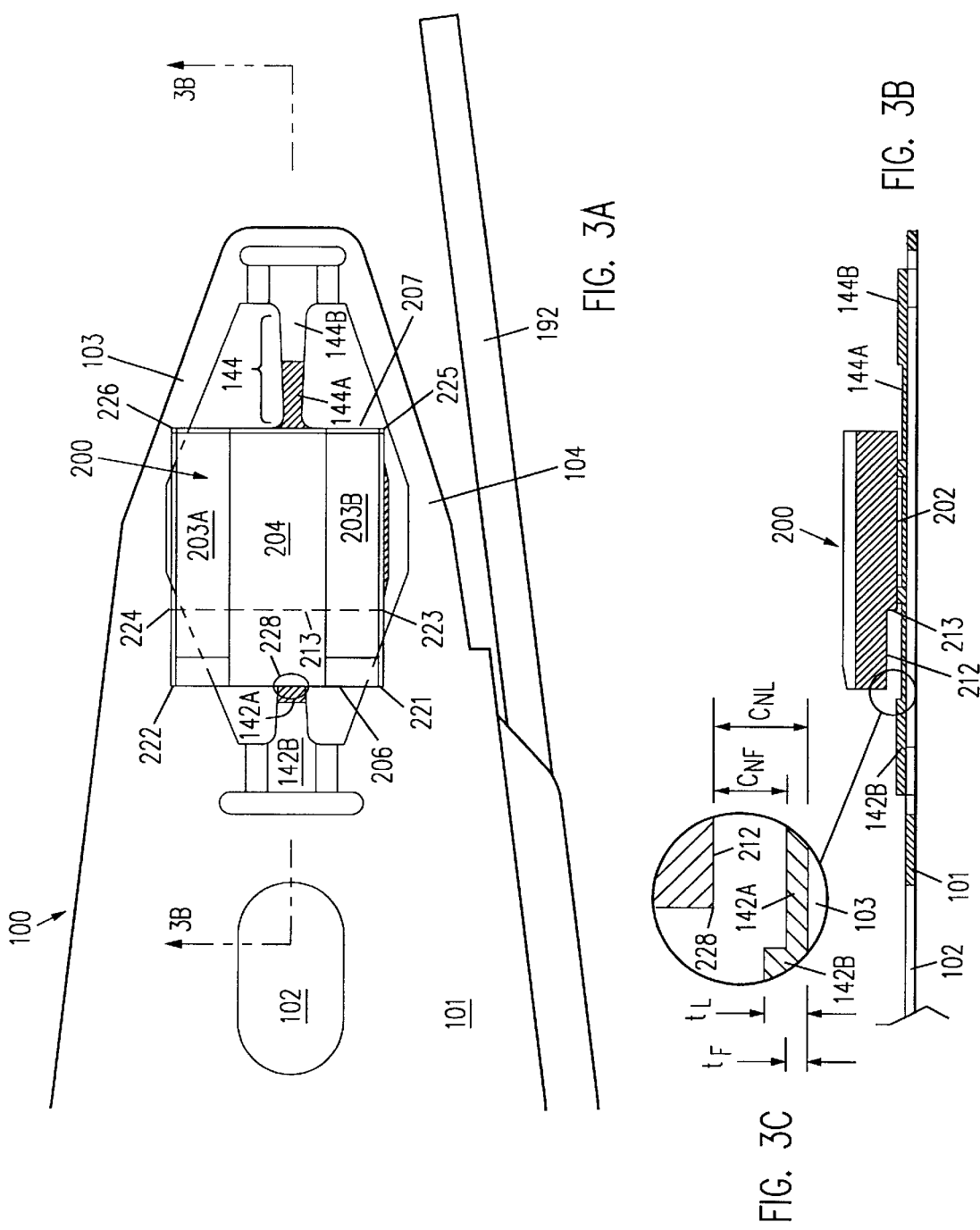

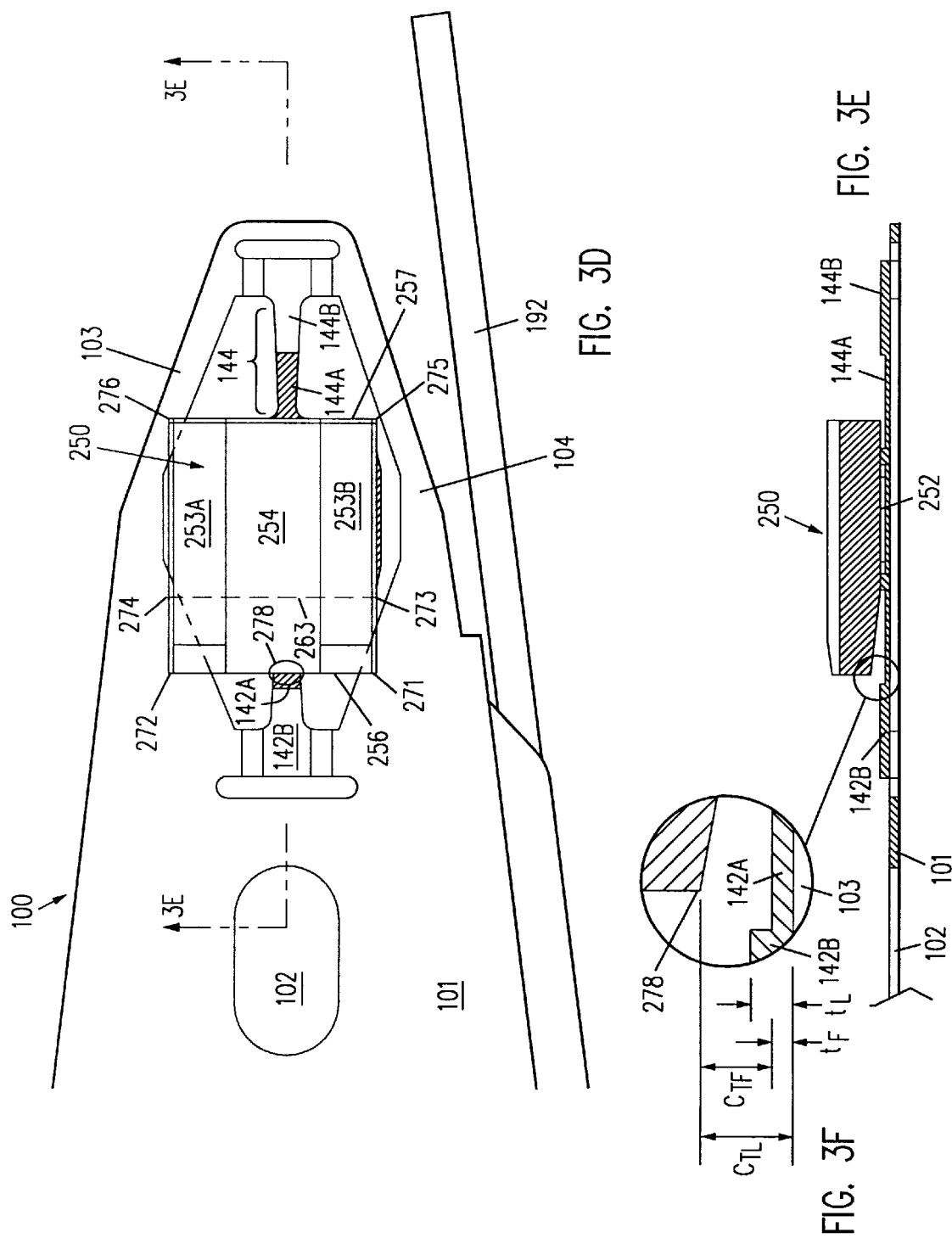

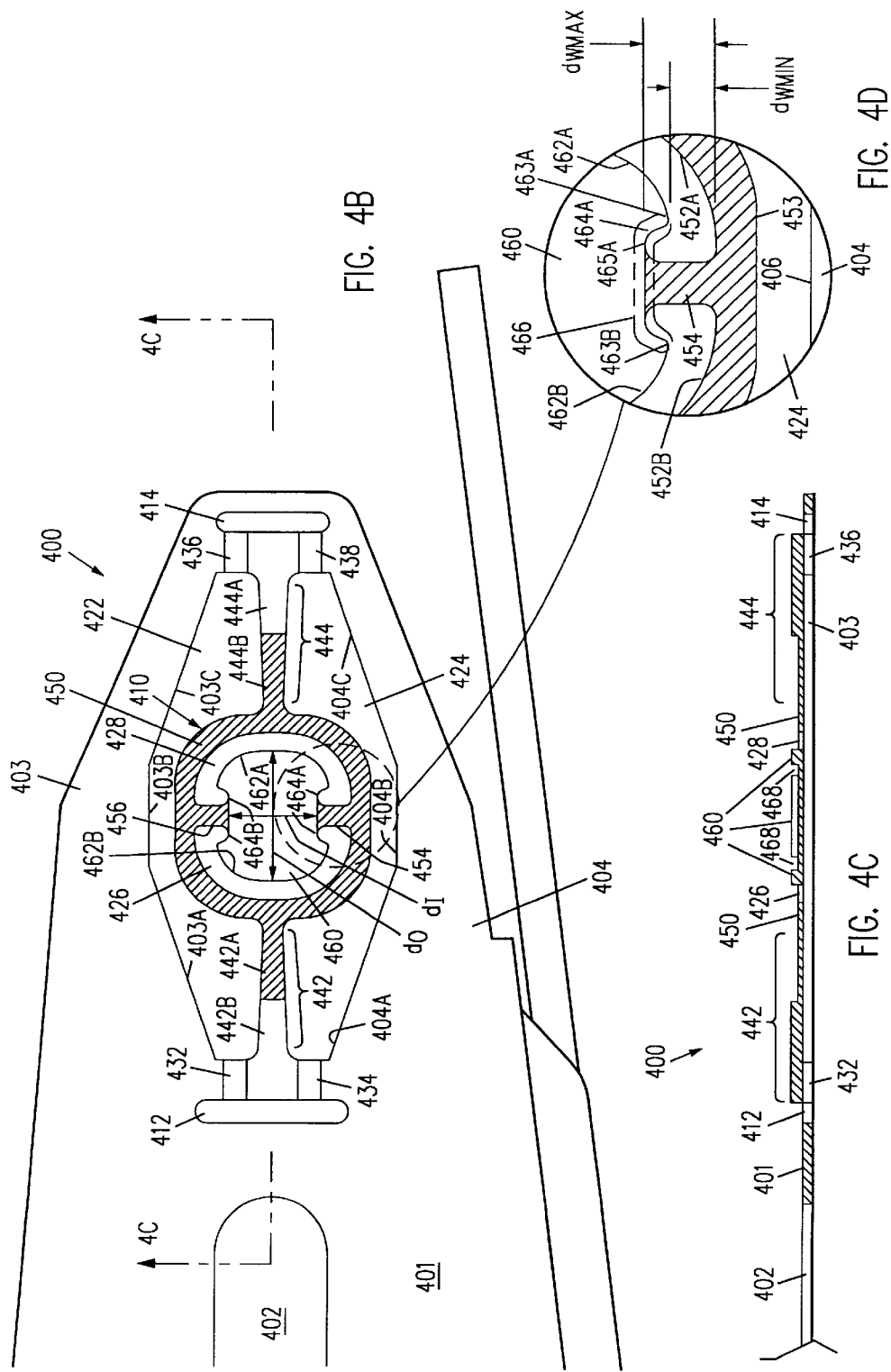

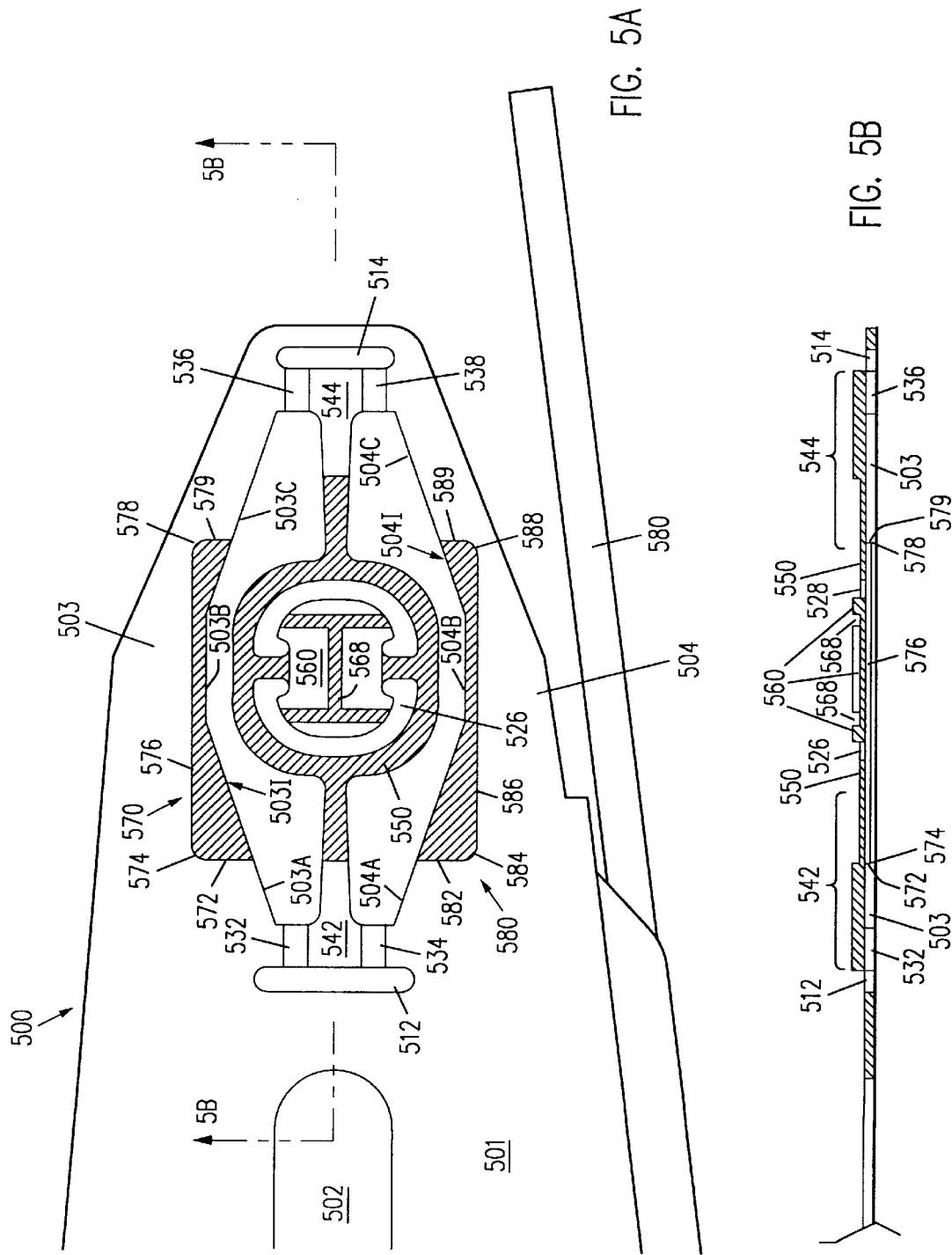

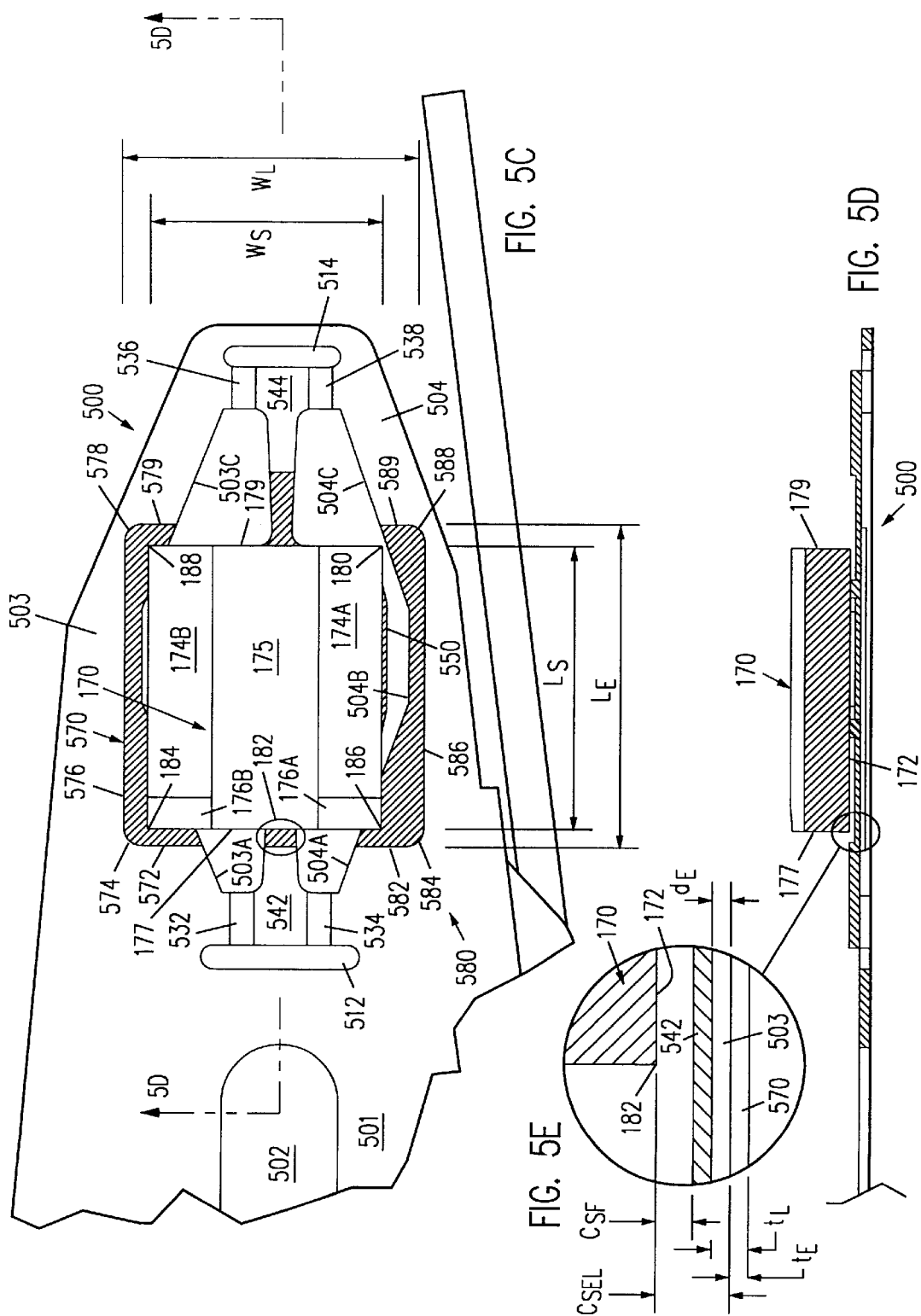

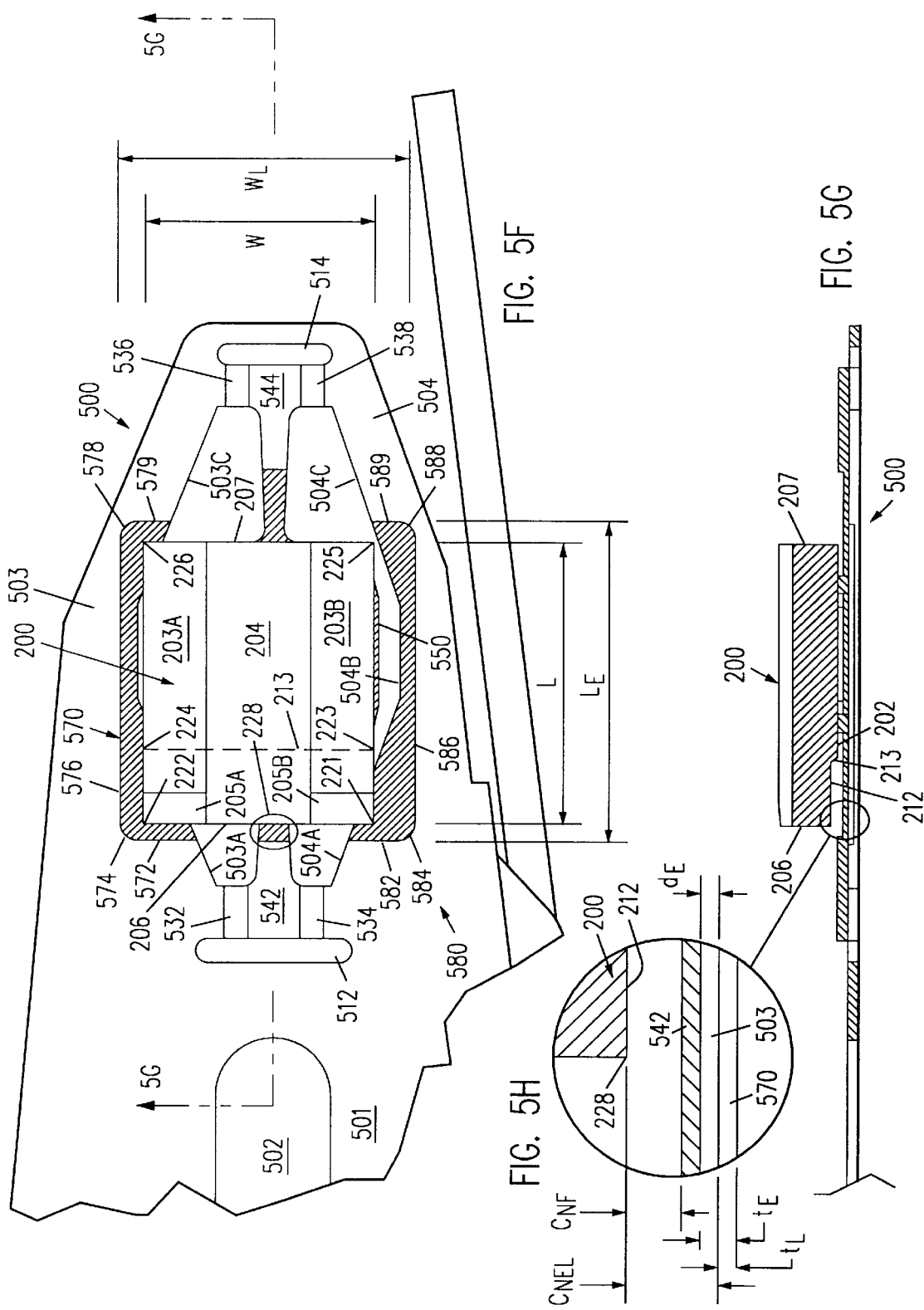

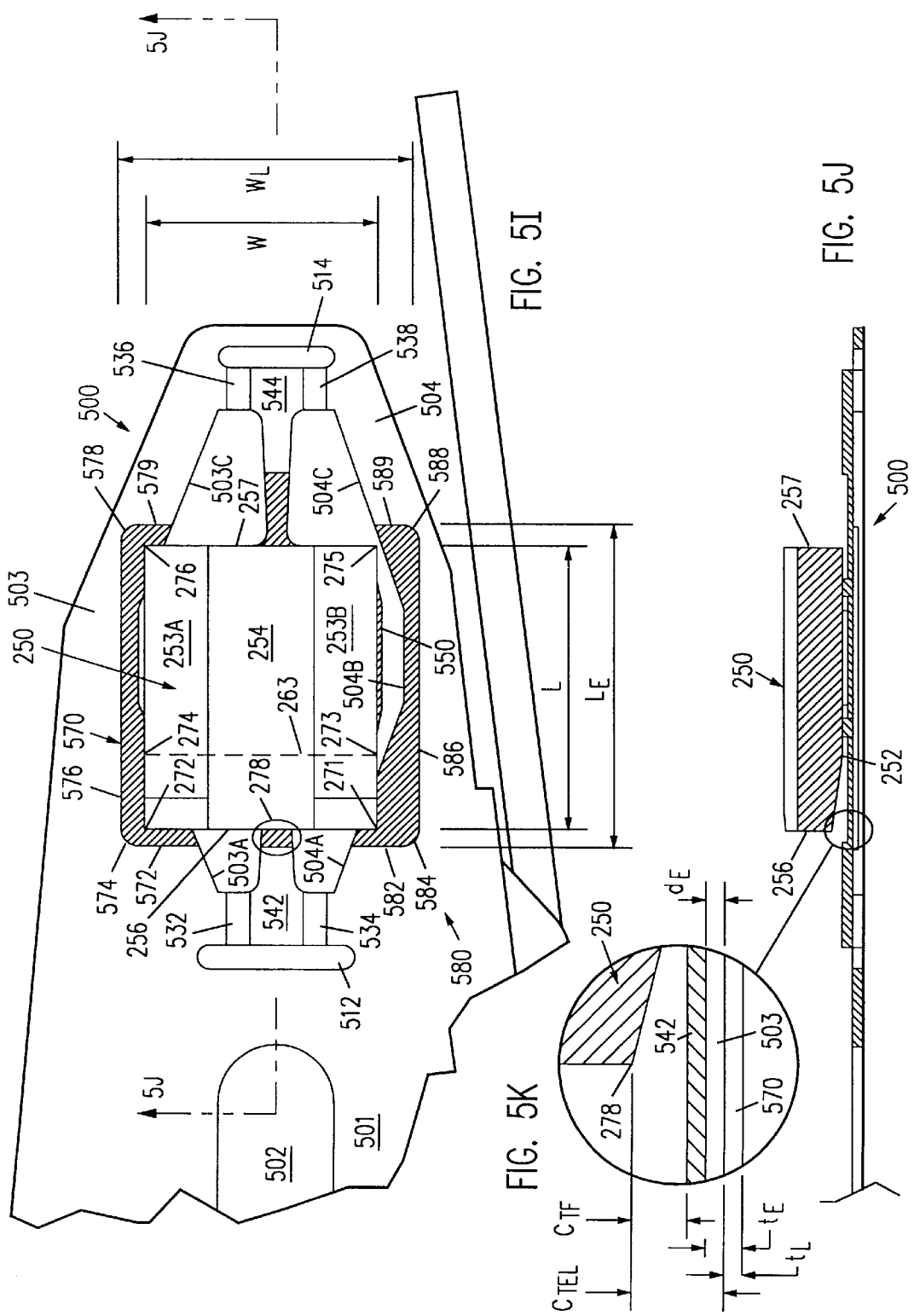

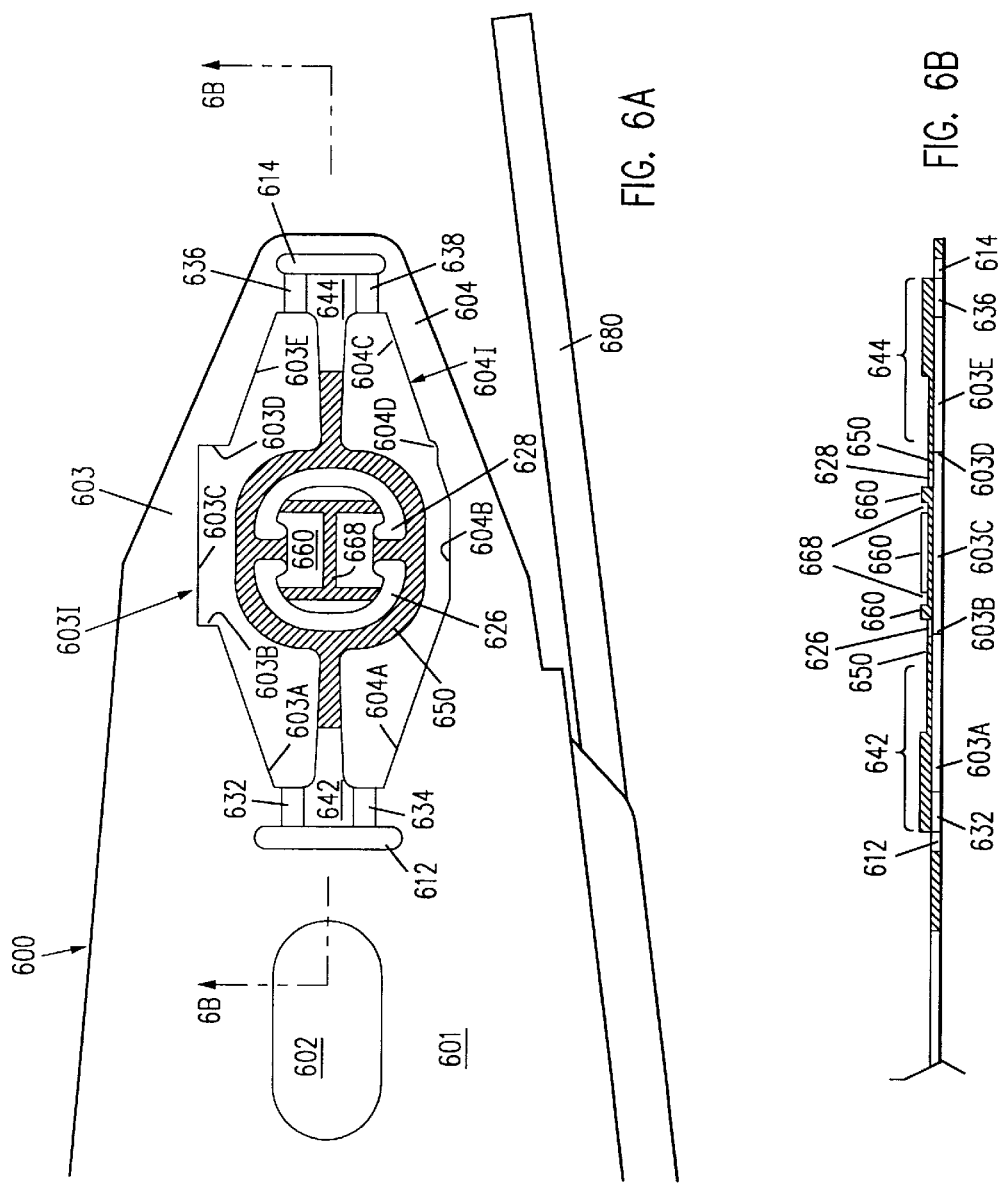

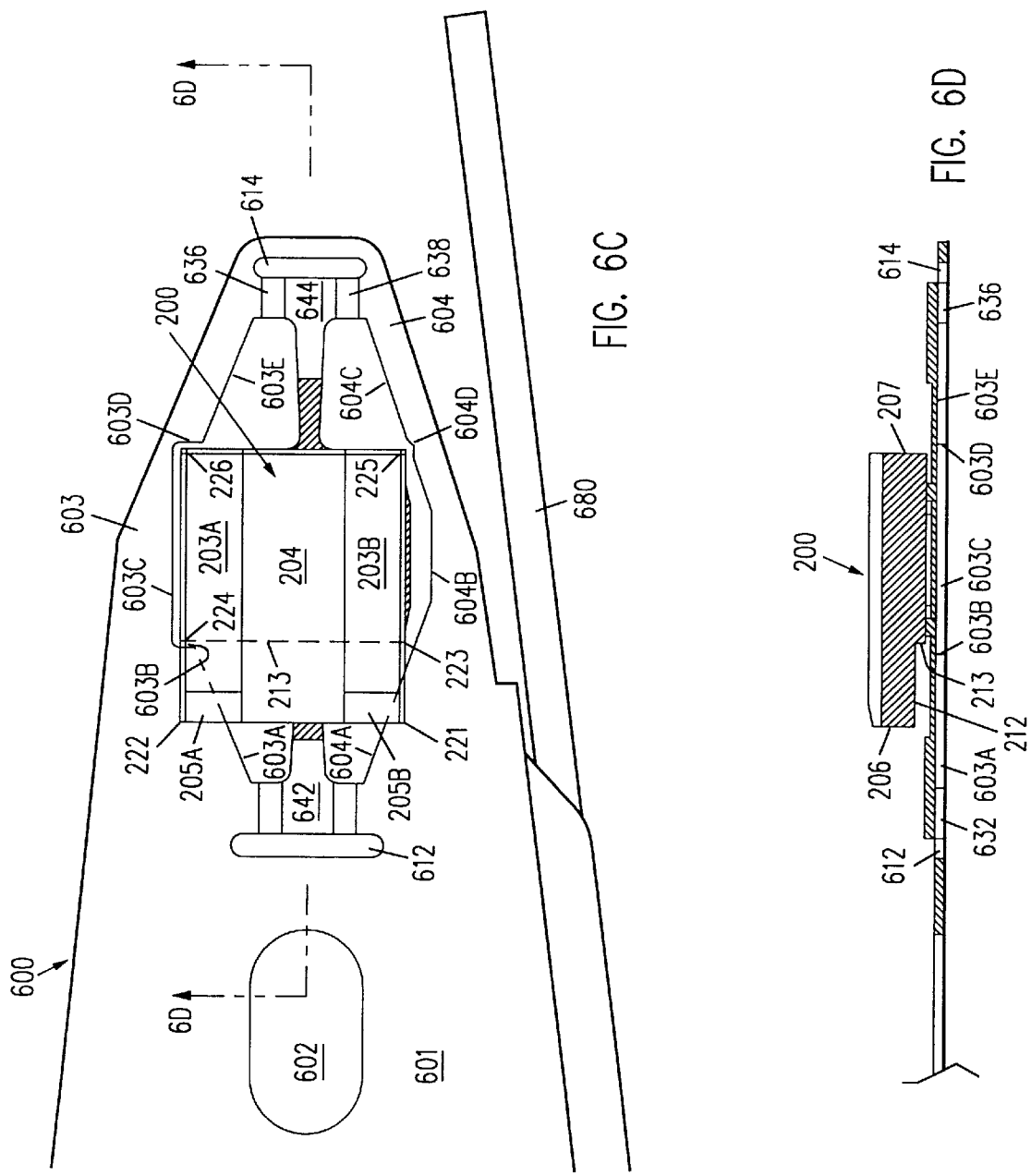

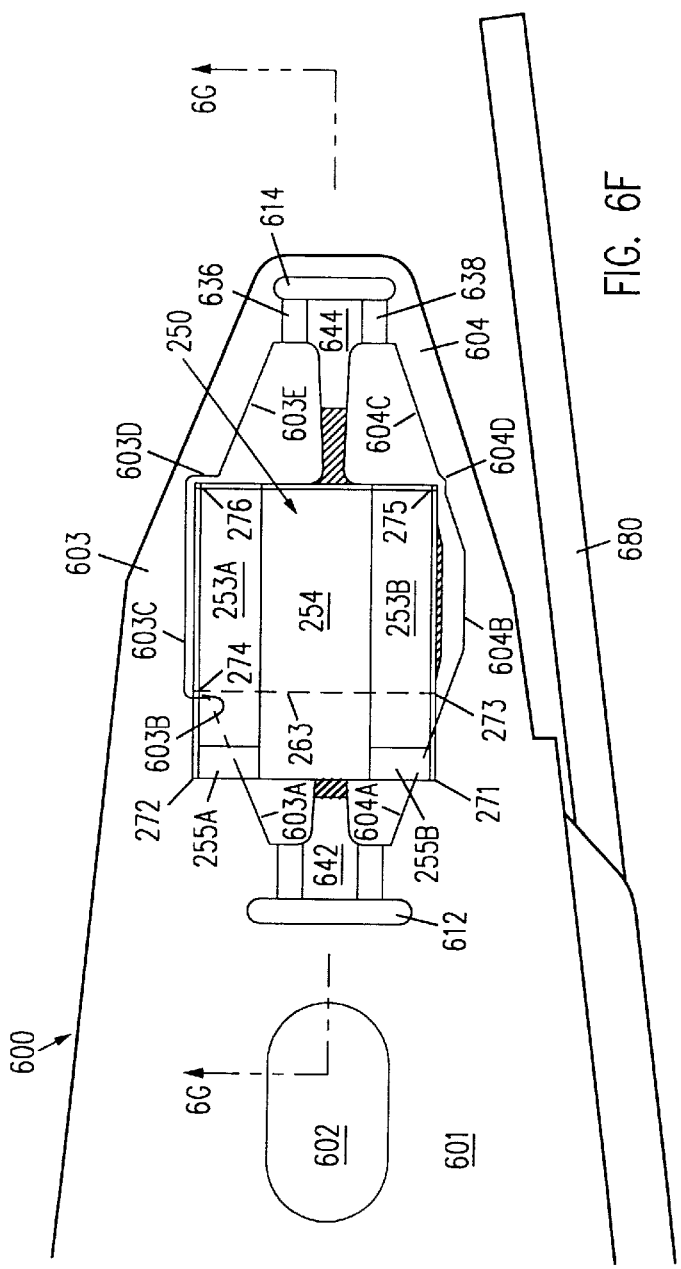
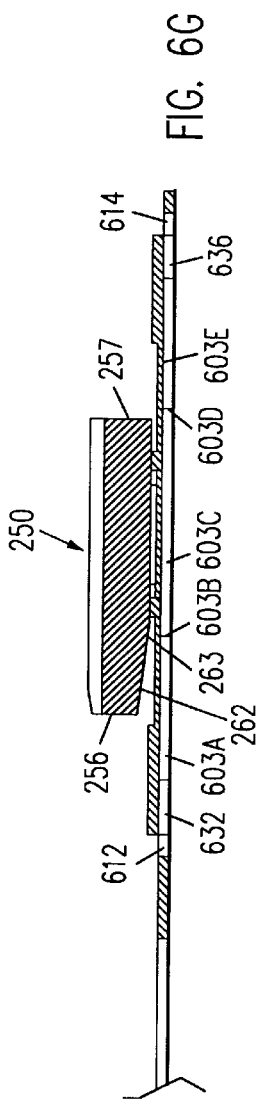

AIR BEARING SLIDER AND HEAD GIMBAL ASSEMBLY

This application is a continuation of application Ser. No. 08/423,587, filed Apr. 17, 1995, abandoned, which is a division of application Ser. No. 08/271,398, filed Jul. 6, 1994, now abandoned.

BACKGROUND OF THE INVENTION

1. Field of the Invention

This invention relates to the field of information storage utilizing rigid disks, and more particularly to an apparatus and method for supporting read/write magnetic recording elements on a load beam having an integral flexure.

2. Description of the Prior Art

Magnetic head suspensions using a unitary load beam with an integral flexure for supporting a read/write head are well known in the prior art. U.S. Pat. No. 5,282,102 granted to Christianson discloses one such suspension. "Type 1650 Product Summary (Sep. 14, 1992)" published by Hutchinson Technology, Inc. of Hutchinson, Minn. also discloses another such suspension.

A prior art Hutchinson Technology Type 1650 suspension 100 (FIG. 1A) includes a lift rod 192 (shown in FIG. 1C), a load beam 101, and a flexure 110 supported by load beam surround portions 103 and 104. Flexure 110 is formed in load beam 101 by removing material to form slots 112, 114 and 116 and windows 122, 124, 126 and 128. Flexure 110 includes supports 132, 134, 136 and 138 which connect load beam surround portions 103 and 104 to roll elements 142 and 144 which in turn support an annular gimbal element 150. Gimbal element 150 is connected by pitch elements 152 and 154 to mounting pad 160 which supports a prior art air bearing slider 170 (FIG. 1B).

Air bearing slider 170 is a solid block with an air bearing side 171 and an opposing mounting side 172. Air bearing side 171 has a channel surface 175 separating a pair of rails 174A and 174B, each having a taper flat 176A and 176B adjacent front face 177. A magnetic read/write element 178 is mounted on a rear face 179 of air bearing slider 170. Mounting side 172 of air bearing slider 170 is a flat plane surface, which is illustrated in FIG. 1D.

When air bearing slider 170 is mounted on suspension 100, air bearing slider corners 184, 186 and 188 overlap load beam surround regions 103 and 104 (FIG. 1C). The overlaps are deliberately provided to act as limit stops during non-operational shock. Corner 180 of air bearing slider 170 may or may not be constrained by suspension 100 depending on how air bearing slider 170 is positioned when it is affixed to mounting pad 160. Referring to FIG. 1B, pitch (X-axis) and roll (Y-axis) angles are constrained to less than ten degrees in both directions by the limit stops at corners 184, 186 and 188. The stiffness of roll elements 142 and 144 and pitch elements 152 and 154 are kept high to constrain the Z-axis (see coordinate system 190 of FIG. 1B) motion of air bearing slider 170 during non-operational shock.

Previously, a separate flexure was required to support an air bearing slider. With the Type 1650 suspension, etching and forming are used to establish a clearance between the air bearing slider and the load beam surround portions in the following manner. Supports 132, 134, 136 and 138 slope out of the plane of load beam surround portions 103 and 104 so as to lift flexure 110 into a different plane. Roll elements 142 and 144 are supported by supports 132 and 134 (for roll element 142) and supports 136 and 138 (for roll element 144) in a plane at a distance $t_L$=0.075 mm from the plane of load beam surround portions 103 and 104. Therefore, a nominal clearance $C_{SL}$=0.075 mm is present between air bearing slider 170 and load beam surround portions 103 and 104 at air bearing slider corners 184, 186 and 188 shown in FIG. 1C.

Moreover, a portion of roll element 144 is etched away so that portion 144A (shown hatched in FIG. 1C) is thinner than portion 144B. For example, typical (but not absolute) dimensions used in the prior art are established by etching a load beam of thickness $t_L$=0.075 mm down to a thickness $t_F$=0.025 mm, results in a nominal clearance $C_{AZ}=t_L-t_F$=0.050 mm between air bearing slider 170 and roll element 142A in the area 182 (FIGS. 1C and 1D and better shown in FIG. 1E). Roll element 142 is similar to roll element 144 and has portions 142A and 142B. Gimbal element 150 has the same thickness as portions 144A and 142A. The nominal clearances listed above are clearances with no load applied to air bearing slider 170.

Reduced thickness of flexure 110 increases the Z-axis compliance of air bearing slider 170 so that when air bearing slider 170 is loaded on the disk (flying above the surface of the disk on an air bearing), the suspension preload (typically 3 to 3.5 grams) reduces clearance $C_{SL}$ to less than 0.020 mm. Furthermore, clearance $C_{AZ}$ is reduced to less than 0.005 mm (due to compliance of flexure 110 in the Z-axis direction). With tolerances applied, interference can occur between roll element 142 and the edge of air bearing slider 170 in the region 182 (FIG. 1C). Any such interference moves the preload point forward relative to the center of pressure of air bearing surfaces of rails 174A and 174B, altering the flying characteristics of air bearing slider 170. In an extreme case, air bearing instability can result causing a head crash.

The interference problem (above) is further compounded by Z-axis shock loads. In the operating mode, if a shock occurs which loads suspension 100 towards the disk, the mass loading of suspension 100 results in a reduction in the clearance between air bearing slider 170 and load beam surround portions 103 and 104 (the effective mass of suspension 100 is approximately three times larger than the mass of air bearing slider 170). Impact at air bearing slider 170's corners 184, 186 and 188 can occur at shocks greater than 60 G's which can result in contact between a corner of air bearing surfaces 174A and 174B with the disk.

Interference problems can be reduced by increasing air bearing slider clearances $C_{AZ}$ and $C_{SL}$. However, increased air bearing slider clearances require custom suspension design which in turn requires major retooling and expense.

SUMMARY OF THE INVENTION

One object of this invention is to provide an inexpensive, simple and effective solution to the interference problems described above.

In accordance with this invention, an air bearing slider is provided which includes a relieved portion in its mounting side. The relieved portion may be provided by establishing a notch (resulting in a stepped-contour) or a taper (resulting in a tapered contour) on the mounting side of the air bearing slider. The stepped-contour includes an adherent surface adjacent to the rear face of the air bearing slider and a notch surface adjacent to the front face of the air bearing slider. The notch surface is closer to the air bearing surfaces than the adherent surface. Therefore when the notched air bearing slider is mounted on a suspension, the notch surface is farther away than the adherent surface from load beam surround portions which support the air bearing slider.

The tapered-contour includes an adherent surface adjacent to the rear face of the air bearing slider and a taper surface adjacent to the front face of the air bearing slider. The taper surface is at an angle to the adherent surface so that the air bearing slider has a smaller thickness at the front face than at the rear face.

The relieved portion of an air bearing slider eliminates interference between the air bearing slider and the load beam surround portions. Also, the air bearing slider overlaps the load beam surround portions in its relieved portion and the overlaps limit angular excursion of the air bearing slider when the air bearing slider is unloaded from the disk. Moreover, depth of the relieved portion of the air bearing slider can be altered easily during grinding for customized multiple drive designs (pitch and roll stiffness, gram load, maximum angular excursion) without the major retooling effort needed for increasing the air bearing slider clearances of the prior art suspensions.

In one embodiment of this invention, the suspension has a mounting pad with a unique convex-concave periphery which includes two outer peripheries and two inner peripheries. The inner peripheries allow the pitch elements of the flexure to be longer than the prior art pitch elements thus allowing the pitch stiffness to be reduced. Control of the depth of the notch surface, thickness of the flexure area and length of the pitch elements allows optimization of pitch and roll stiffness while still maintaining angular excursion limits.

However, when the pitch and roll stiffness are reduced, the corners of the air bearing slider's adherent surface can contact the load beam surround portions, especially under Z-axis operational shock loads. To eliminate any potential contact between the corners of the adherent surface of the air bearing slider and the load beam surround portions, cutouts are provided in the load beam surround portions adjacent to the adherent surface. The cutouts are such that the adherent surface can easily clear the load beam surround portions during Z-axis motion of the air bearing slider. The cutouts to load beam surround portions of the suspension are easily formed using an etching process by generating new etch artwork. Depending on the embodiment, the air bearing slider can overlap the load beam surround portions and any such overlaps limit angular excursion of the air bearing slider when the air bearing slider is unloaded from the disk.

In another embodiment of this invention, the cutouts are replaced by additional partial etch zones. The partial etch zones are such that additional clearance is created during Z-axis motion of the air bearing slider. The additional partial etch zones also limit angular excursion of the air bearing slider when the air bearing slider is unloaded from the disk.

BRIEF DESCRIPTION OF THE DRAWINGS

FIGS. 1B, 1C and 1D are, respectively, a perspective view, a plan view and a cross-sectional view (along lines 1D—1D of FIG. 1C) of a prior art Type 1650 suspension with an air bearing slider mounted on the flexure.

FIG. 3A is a plan view of the air bearing slider of FIG. 2A mounted on a prior art type 1650 suspension.

FIG. 3B is a cross-sectional view taken along lines 3B—3B of FIG. 3A.

FIG. 3C is an enlarged view of the encircled area in FIG. 3B showing the clearance between the suspension of FIG. 1A and the air bearing slider of FIG. 2A.

FIG. 3D is a plan view of the air bearing slider of FIG. 2E mounted on a prior art type 1650 suspension.

FIG. 3E is a cross-sectional view taken along the lines 3D—3D of FIG. 3C.

FIG. 3F is an enlarged view of the encircled area in FIG. 3E showing the clearance between suspension of FIG. 1A and the air bearing slider of FIG. 2E.

FIG. 4B is an enlarged view of the flexure portion of the suspension of FIG. 4A.

FIG. 4C is a cross-sectional view taken along lines 4C—4C of FIG. 4B.

FIG. 4D is an enlarged view of the outer and inner peripheries of the mounting pad of FIG. 4B.

FIG. 5A is a plan elevation view of another embodiment of a suspension in accordance with this invention.

FIG. 5B is a cross-sectional view taken along lines 5B—5B in FIG. 5A.

FIG. 5C is a plan view of the prior art air bearing slider of FIG. 1B mounted on the suspension of FIG. 5A.

FIG. 5D is a cross-sectional view taken along lines 5D—5D in FIG. 5C.

FIG. 5E is an enlarged view of the area encircled in FIG. 5D showing the clearances between the air bearing slider of FIG. 2A and the suspension of FIG. 5A.

FIG. 5F is a plan view of the air bearing slider of FIG. 2A mounted on the suspension of FIG. 5A.

FIG. 5G is a cross-sectional view taken along lines 5G—5G in FIG. 5F.

FIG. 5H is an enlarged view of the area encircled in FIG. 5G showing the clearance between the suspension of FIG. 5A and the air bearing slider of FIG. 2A.

FIG. 5I is a plan view of the air bearing slider of FIG. 2E mounted on the suspension of FIG. 5A.

FIG. 5J is a cross-sectional view taken along lines 5J—5J in FIG. 5I.

FIG. 5K is an enlarged view of the area encircled in FIG. 5J showing the clearance between the suspension of FIG. 5A and the air bearing slider of FIG. 2E.

FIG. 6A is a plan elevation view of another embodiment of a suspension in accordance with this invention.

FIG. 6B is a cross-sectional view taken along lines 6B—6B in FIG. 6A.

FIG. 6C is a plan view of the air bearing slider of FIG. 2A mounted on the suspension of FIG. 6A.

FIG. 6D is a cross-sectional view taken along lines 6D—6D in FIG. 6C.

FIG. 6F is a plan view of the air bearing slider of FIG. 2E mounted on the suspension of FIG. 6A.

FIG. 6G is a cross-sectional view taken along lines 6G—6G in FIG. 6F.

DETAILED DESCRIPTION OF THE PREFERRED EMBODIMENTS

Figure 1A:
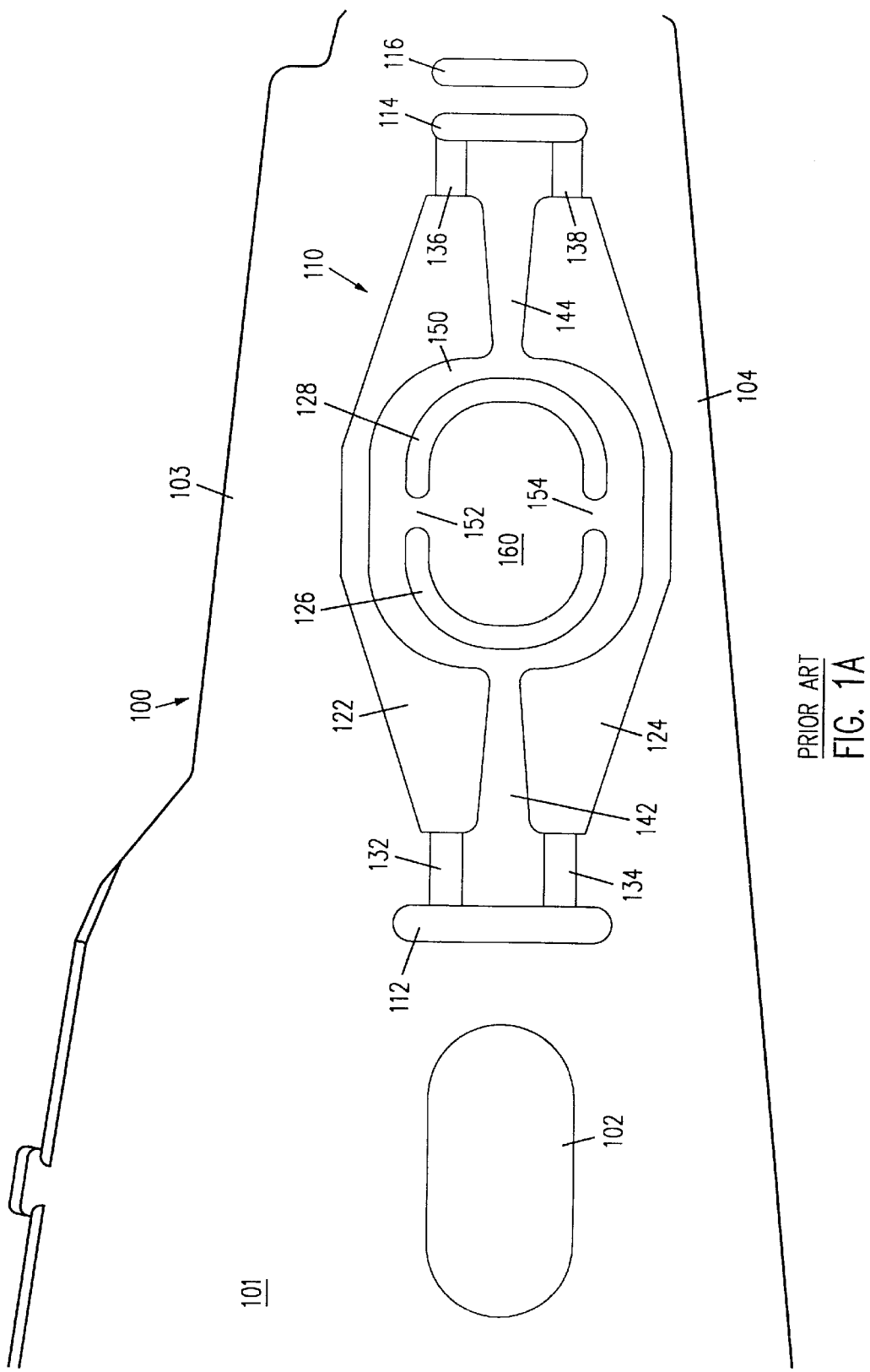
FIG. 1A is a plan view of a prior art Type 1650 suspension having a load beam with an integral flexure.
Figure 1B:
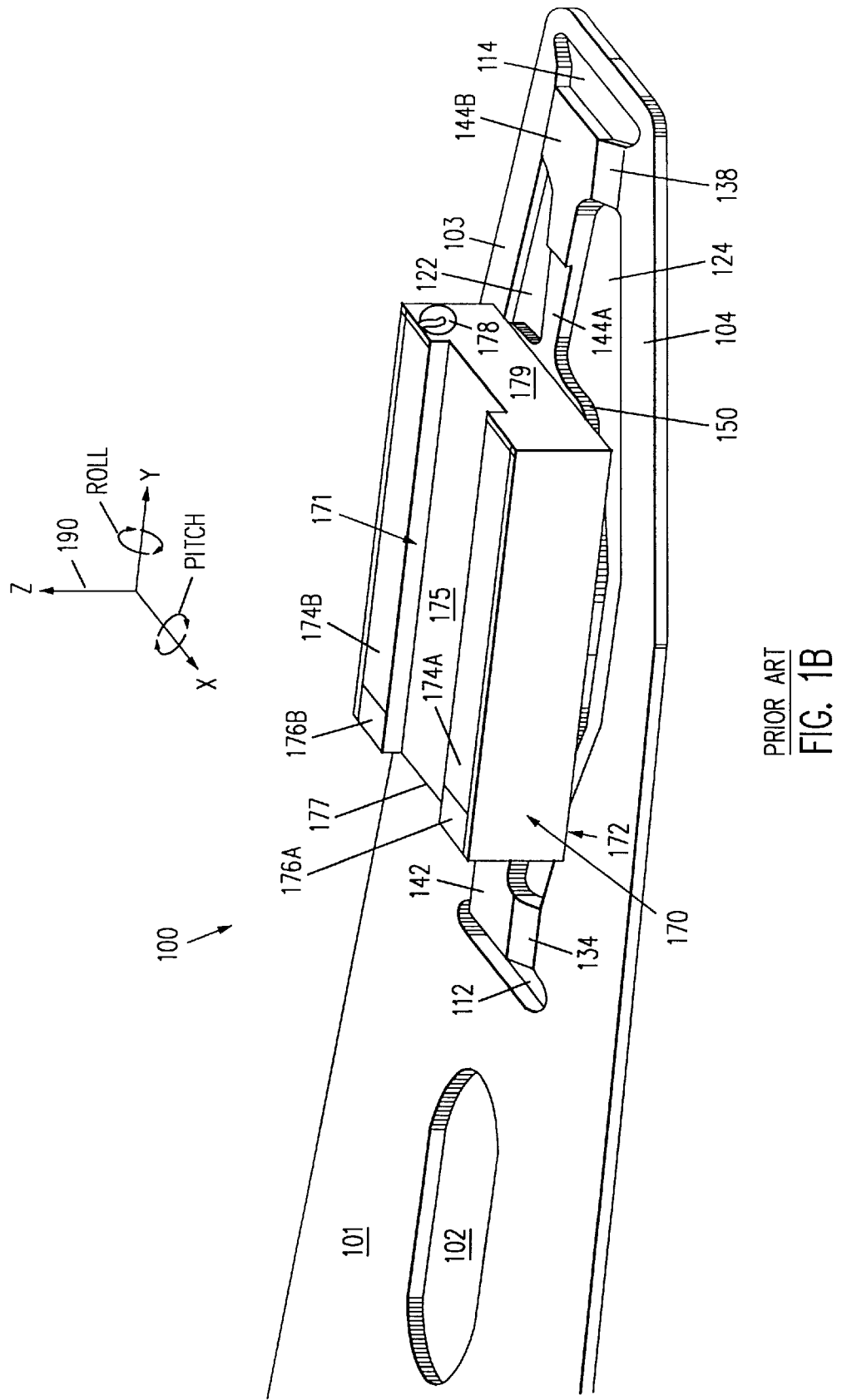
Figure 2D:
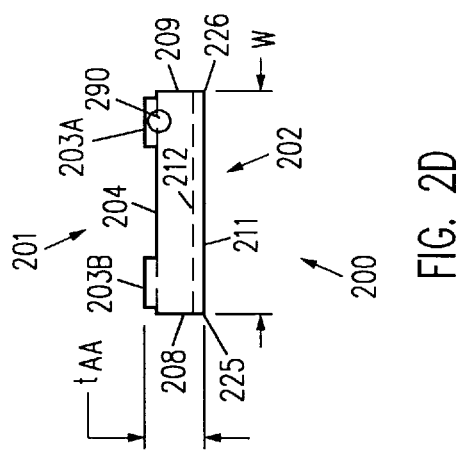
FIG. 2D is a side elevation view of the air bearing slider of FIG. 2B.

FIGS. 2A, 2B, 2C and 2D are illustrative top plan view, side view, bottom plan view and rear elevation view respectively of one embodiment of an air bearing slider 200 in accordance with this invention. Air bearing slider 200 has an air bearing side 201 (FIGS. 2A, 2B and 2D) and a mounting side 202 (FIGS. 2B, 2C and 2D) opposite to air bearing side 201. Air bearing side 201 has two rails 203A and 203B (FIGS. 2A and 2D) to provide air bearing surfaces, these rails being separated by a channel surface 204. Each of the rails 203A and 203B is provided with a taper flat portion 205A and 205B respectively adjacent to front face 206 of air bearing slider 200. Opposite to front face 206 is a rear face 207 on which is mounted a read write element 290 (FIG. 2D).

Figure 2A:
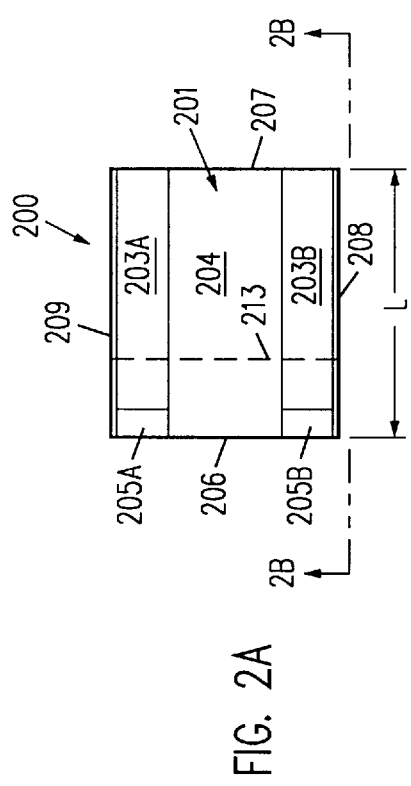
FIG. 2A is a top plan view of an air bearing slider in accordance with this invention.
Figure 2B:
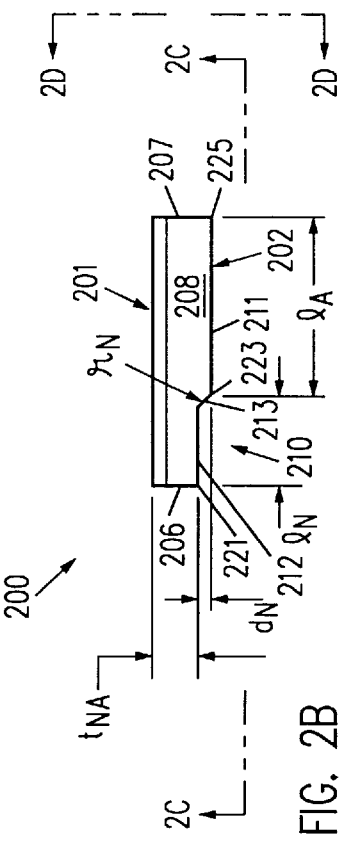
FIG. 2B is an elevation view of the air bearing slider of FIG. 2A.
Figure 2C:
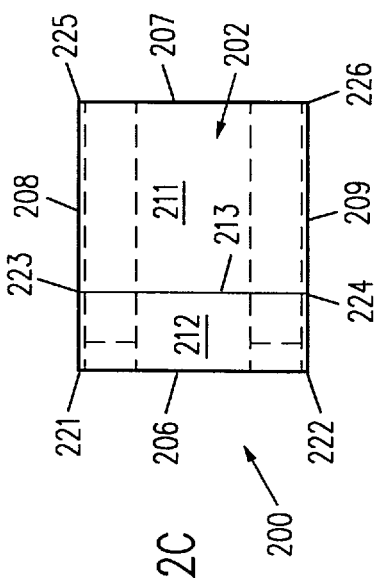
FIG. 2C is a bottom plan view of the air bearing slider of FIG. 2A.
Figure 2E:
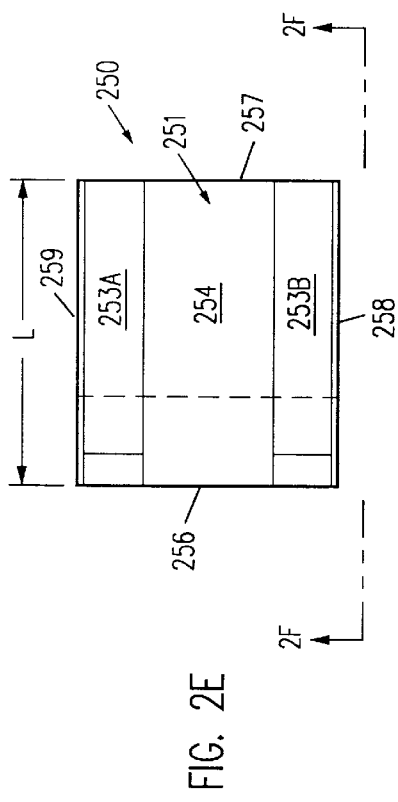
FIGS. 2E, 2F, 2G and 2H are illustrative top plan view, side view, bottom plan view and rear elevation view respectively of another embodiment of an air bearing slider in accordance with this invention.

Mounting side 202 has a stepped-contour 210. Stepped-contour 210 includes three surfaces: an adherent surface 211 adjacent to rear face 207, a notch surface 212 adjacent to front face 206 and a notch connecting surface 213 (FIG. 2B). Notch surface 212 is closer to air bearing surfaces 203A and 203B than adherent surface 211. Therefore when notched air bearing slider 200 is mounted on a suspension, notch surface 212 is farther away than adherent surface 211 from the load beam surround portions which support the air bearing slider.

Adherent surface 211 has length $l_A$ (FIG. 2B) and the width W (FIG. 2D). Furthermore, adherent surface 211 is at a first distance $t_{AA}$ (FIG. 2D) from the air bearing surfaces of rails 203A and 203B. Notch surface 212 has a length $l_N$ (FIG. 2B) such that $l_N+l_A=L$, the total length of air bearing slider 200 (FIG. 2A). Notch surface 212 is at a distance $t_{NA}$ (FIG. 2B) from air bearing surfaces of rails 203A and 203B so as to define a notch depth $d_N=t_{AA}-t_{NA}$ (FIG. 2B). Notch surface 212 is adjacent front face 206 and adherent surface 211 is adjacent rear face 207. Notch surface 212 is connected to adjacent adherent surface 211 by notch connecting surface 213 which has a curvature of radius $r_N$.

Mounting side 202 of air bearing slider 200 has more than four corners because of stepped-contour 210. The two front notch corners 221 and 222 (FIG. 2C) are formed by the intersections of front face 206, notch surface 212 and longitudinal sides 208 and 209 respectively. Rear adherent corners 225 and 226 are formed by the intersection of rear face 207, adherent surface 211 and longitudinal sides 208 and 209. Finally, notch adherent corners 223 and 224 are formed by the intersection of notch connecting surface 213, adherent surface 211 and longitudinal sides 208 and 209 respectively.

In one embodiment of this invention, notch surface 212 is formed by grinding. In one embodiment of this invention, air bearing slider 200 has the following dimensions. Air bearing slider 200 has a width W=1.600 mm, a length L=2.032 mm and a thickness $t_{AA}$=0.432 mm. Notch surface 212 is formed such that length $i_N$=0.600 mm and adherent surface 211 has a length $l_A$ of =1.432 mm. Thickness of air bearing slider 200 at notch surface 212 is $t_{NA}$=0.352 mm such that notch depth $d_N$=0.080 mm. Notch connecting surface 213 has a curvature of radius $r_N$=0.080 mm.

FIGS. 2E, 2F, 2G and 2H are illustrative top plan view, side view, bottom plan view and rear elevation view respectively of another embodiment of an air bearing slider 250 in accordance with this invention. Air bearing slider 250 has an air bearing side 251 (FIGS. 2E, 2F and 2H) and a mounting side 252 (FIGS. 2F, 2G and 2H) opposite to air bearing side 251. Air bearing side 251 is similar to air bearing side 201 of air bearing slider 200 (FIG. 2A).

Figure 2F:
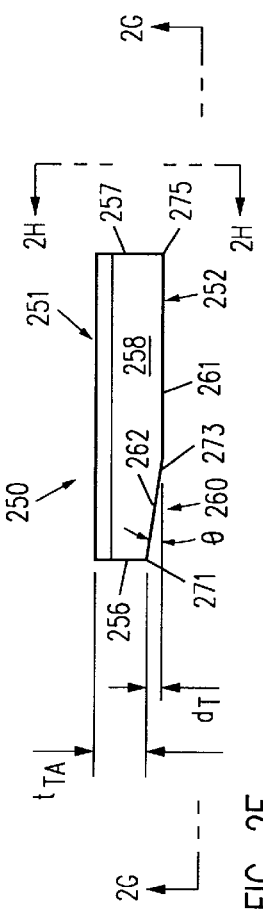
Figure 2H:
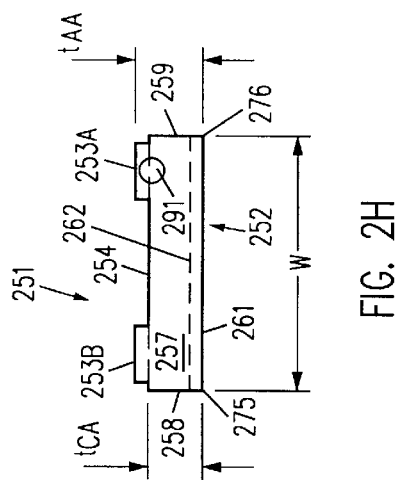

Mounting side 252 has a tapered-contour 260. Tapered-contour 260 includes two surfaces: an adherent surface 261 adjacent to rear face 257 and a taper surface 262 adjacent to front face 256 (FIG. 2F).

Adherent surface 261 has a length $l_A$ (FIG. 2G) and a width W (FIG. 2H) which are identical to the length and width of adherent surface 211 of FIGS. 2B and 2D (listed above). Furthermore, air bearing slider 250 has a first thickness $t_{AA}$ (FIG. 2H) between the air bearing surfaces of rails 253A and 253B and adherent surface 261 which is identical to the corresponding distance $t_{AA}$ of air bearing slider 200 (FIG. 2D).

Figure 2G:
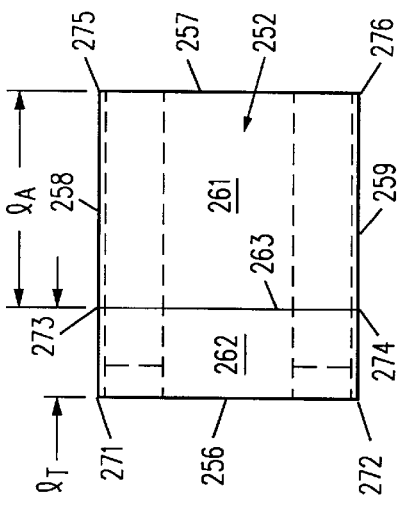

Taper surface 262 has a length $l_T$ (FIG. 2G) such that $l_T+l_A=L$, the total length of air bearing slider 250 (FIG. 2E) which is identical to the total length of air bearing slider 200. Taper surface 262 intersects adherent surface 261 at line 263 at an angle θ (FIGS. 2G and 2F). At front face 256, slider 250 has a second thickness between taper surface 262 and air bearing surfaces of rails 253A and 253B of $t_{TA}$ (identical to $t_{NA}$ of FIG. 2F) such that a taper depth $d_T=t_{CA}-t_{TA}$. In the embodiment shown in FIG. 2F, taper depth $d_T$ is identical to notch depth $d_N$ of slider 200 described above. Furthermore, taper surface length $l_T$ is also identical to the notch surface length $l_N$ of air bearing slider 200. Therefore angle θ is defined by the formula: tan θ=($d_T/l_T$). In one embodiment, θ=0.13 radians (0.8°).

Although in the above description, air bearing slider 250 has dimensions similar or identical to those of air bearing slider 200, an air bearing slider 250 can have any desirable dimensions in accordance with this invention.

Either air bearing slider 200 or air bearing slider 250 can be used depending on which fits better into the machining process being used by the manufacturer. The air bearing sliders described herein may be constructed using materials such as ferrite, CaTi or $Al_2O_3$-TiC by processes well known to those skilled in the art.

FIGS. 3A and 3B illustrate plan and cross-sectional view (along lines 3B—3B) of a notched air bearing slider 200 mounted on a prior art suspension 100. In accordance with this invention, an air bearing slider can be mounted by applying an adhesive such as epoxy on a mounting pad of a suspension and placing the adherent surface of the air bearing slider in contact with the adhesive. When air bearing slider 200 is mounted on suspension 100 there is an air bearing slider-flexure clearance $C_{NF}$ (FIG. 3C) between the region 228 of notch surface 212 and roll element region 142A. Clearance $C_{NF}$=0.130 mm is greater than the prior art air bearing slider flexure clearance $C_{AZ}$ by the amount of notch depth $d_N$=0.080 mm. Moreover, an air bearing slider-load beam clearance $C_{NL}$=0.155 mm between notch surface 212 and suspension 100 (between corners 221, 222 and 226 of air bearing slider 200 and load beam surround portions 103 and 104) is also greater than the prior art air bearing slider-load beam clearance $C_{SL}$ by the amount of notch depth $d_N$.

FIGS. 3D and 3E illustrate plan and cross-sectional view (along lines 3E—3E) of a tapered air bearing slider 250 mounted on a prior art suspension 100. There is an air bearing slider-flexure clearance $C_{TF}$ (FIG. 3F) between tapered surface 262 and roll element region 142A. Clearance $C_{TF}$ is identical to the clearance $C_{NF}$ of FIG. 3C described above. Moreover, air bearing slider-load beam clearance $C_{TL}$ is also identical to the clearance $C_{NL}$ of FIG. 3C described above.

Therefore a relieved air bearing slider (such as one of air bearing sliders 200 and 250) eliminates interference between the air bearing slider mounting surface and load beam surround portions 103 and 104 while the air bearing slider is loaded onto the disk. Also, a relieved air bearing slider overlaps load beam surround portions 103 and 104 over notch surface 212 or taper surface 262 which limits angular excursion of the air bearing slider when the air bearing slider is unloaded from a disk. Moreover, depth $d_N$ or $d_T$ of the relieved area of the air bearing slider can be altered easily during grinding for customized multiple drive designs (pitch and roll stiffness, gram load, maximum angular excursion) without the major retooling effort needed for the prior art suspensions with increased air bearing slider clearances.

To maintain the flying height of an air bearing slider within the accuracy required for the best read/write and reliability performance of a read/write element, roll and pitch torsional stiffness of the suspension must be kept small (in the range of less than 3.0 $\mu$Nmm/deg). To provide improved performance in the slider suspension combinations (above), pitch and roll stiffness was reduced, and a higher gram load on the air bearing slider was utilized. This reduction in stiffness required more clearance between the air bearing slider mounting side and the load beam surround portions 103 and 104 which is provided by the relieved area such as notch surface 212 and taper surface 262. In the embodiment illustrated in FIGS. 4A—4E, which are described below, the notch in air bearing slider 200 provides the additional clearance.

Figure 4A:
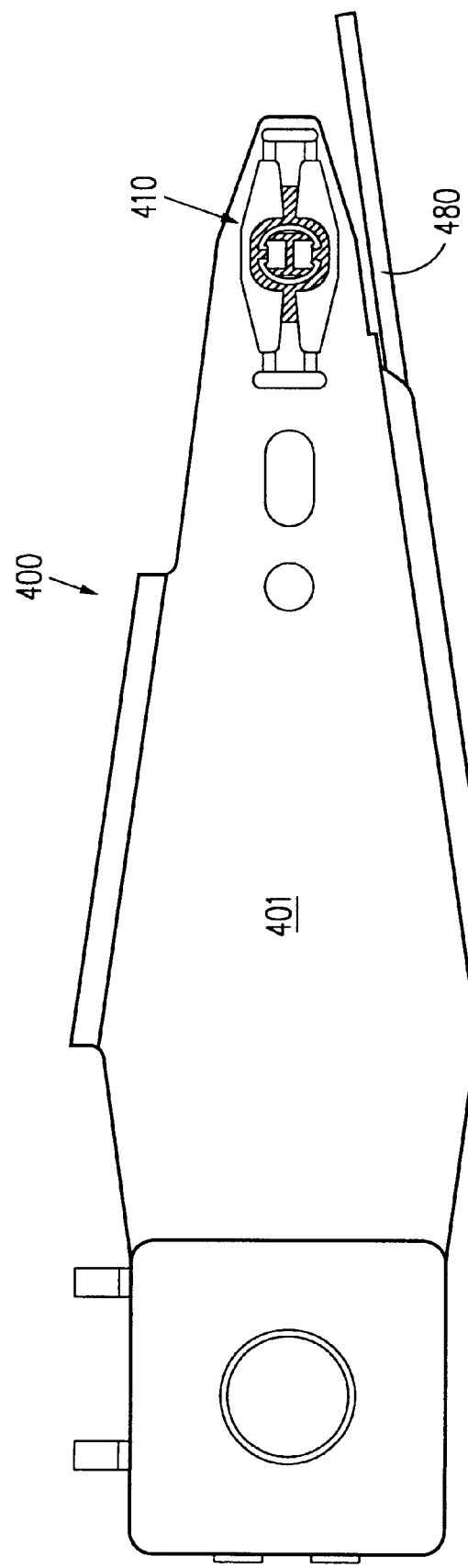
FIG. 4A is a plan view of a suspension in accordance with this invention.

FIG. 4A is a plan view of a suspension 400 in accordance with this invention. Suspension 400 includes a lift rod 480, a load beam 401 and a flexure 410 which is formed integral with load beam 401. Suspension 400, as well as the other suspension described herein, are made of stainless steel such as 300 series. Suspension 400, as well as the other suspensions described herein, may be advantageously used in a disk drive such as that described and claimed in U.S. Pat. No. 5,289,325 to Morehouse et al., issued Feb. 22, 1994. This patent is incorporated herein by reference in its entirety.

Figure 6E:
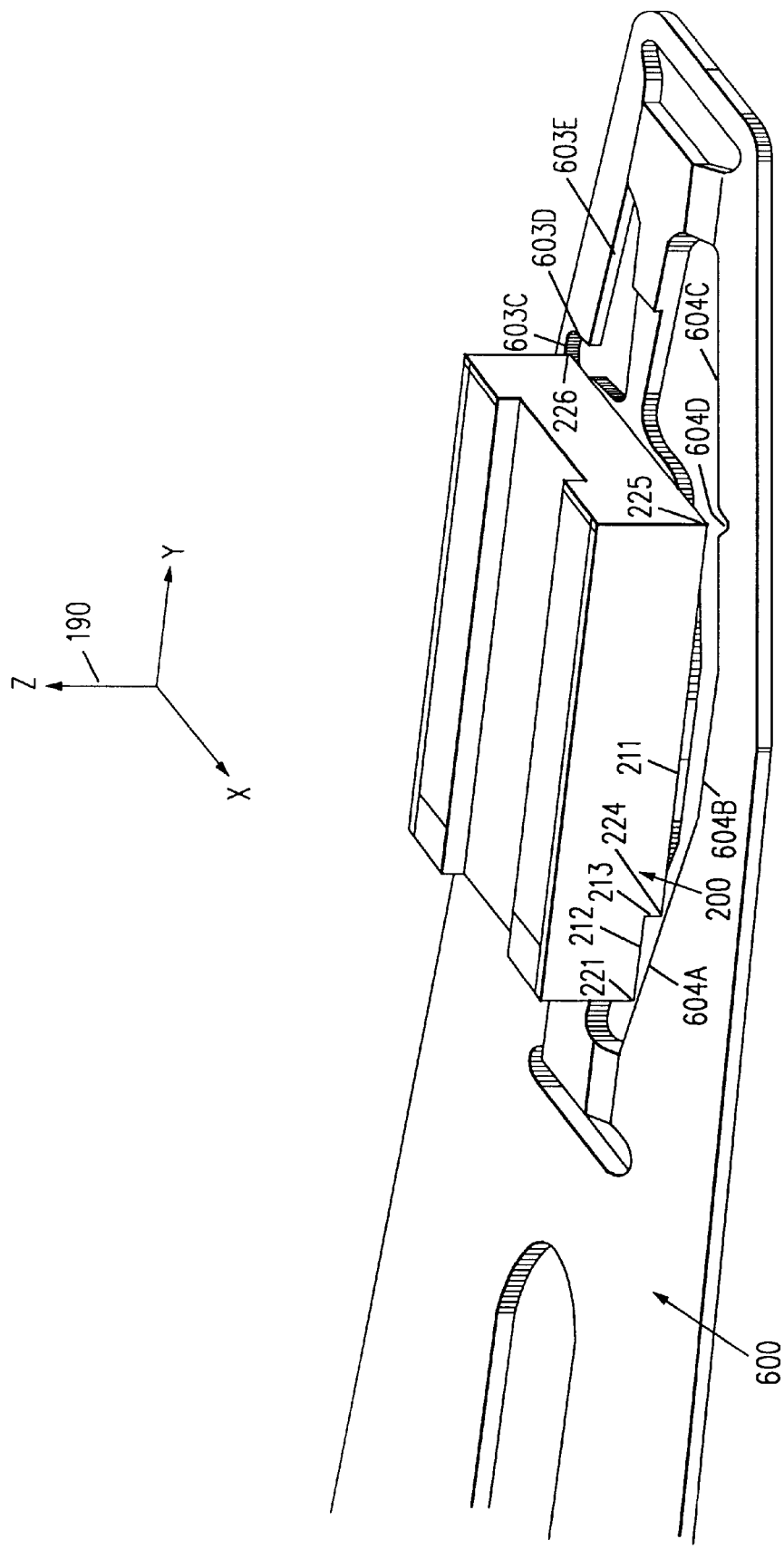
FIG. 6E is a perspective view of the air bearing slider of FIG. 2A mounted on the suspension of FIG. 6A.
Figure 6H:
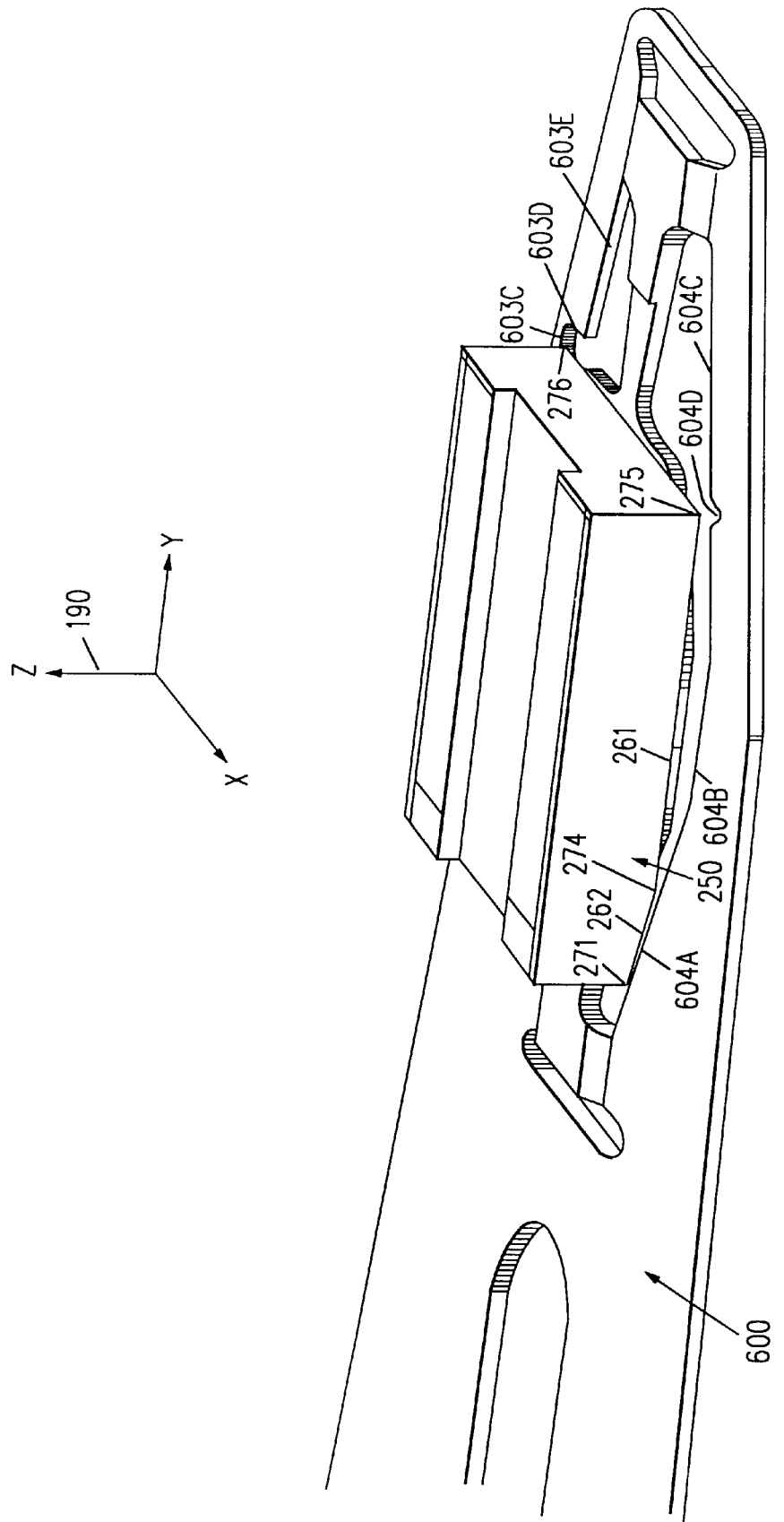
FIG. 6H is a perspective view of the air bearing slider of FIG. 2E mounted on the suspension of FIG. 6A.

Flexure 410 is shown in greater detail in FIGS. 4B, 4C and 4D. Flexure 410 is etched to remove material from flexure slots 412 and 414, flexure windows 422 and 424 and mounting pad windows 426 and 428. Sloping supports 432 and 434 support roll element 442. Similarly, sloping supports 436 and 438 support roll element 444. Sloping support elements 432, 434, 436 and 438 are sloped in the same direction as the sloping support elements illustrated in FIG. 6E, thus mounting pad 460 is raised (as viewed in FIG. 4B) above the plane of load beam 401. Roll elements 442 and 444 in turn support an annular gimbal element 450. Gimbal element 450 is connected by pitch elements 454 and 456 to mounting pad 460 which supports an air bearing slider (such as one of air bearing sliders 100 and 200 described above).

Mounting pad 460 has a unique convex-concave periphery which includes two outer peripheries 462A and 462B (FIG. 4B) and two inner peripheries 464A and 464B (FIG. 4B). As illustrated in FIG. 4B, the distance $d_I$ between inner peripheries 464A and 464B is smaller than the distance $d_O$ between outer peripheries 462A and 462B. Inner periphery 464A (shown better in FIG. 4D) is the portion of the periphery of mounting pad 460 enclosed by the dotted line 466. An intermediate point 463A between outer periphery 462A and inner periphery 464A is at a distance $d_{WMIN}$ from the inner periphery 452A of gimbal element 450. Furthermore, the common point 465A between inner periphery 464A and pitch element 454 is at a distance $d_{WMAX}$ from inner periphery 452A of gimbal element 450.

The periphery of mounting pad 460 is formed in such a way that outer periphery 462A of mounting pad 460 is at a first distance from inner periphery 452A of gimbal element 450. On the other hand, inner periphery 464A of mounting pad 460 is at a second distance from inner periphery 452A of gimbal element 450. Although the second distance is equal to the first distance at intermediate point 463A, the second distance is larger than the first distance at all points of inner periphery 464A. Such a convex-concave periphery of mounting pad 460 formed by outer (convex) peripheries 462A and 462B and inner (concave) peripheries 464A and 464B. Inner (concave) peripheries 464A and 464B allow pitch elements 454 and 456 to be longer than prior art pitch elements while ensuring a large surface area of mounting pad 460. Longer pitch elements 454 and 456 allow pitch stiffness to be reduced.

In the embodiment shown in FIG. 4B, load beam surround portion 403 has an inner periphery which includes straight sides 403A, 403B and 403C. Similarly, load beam surround portion 404 has an inner periphery which includes straight sides 404A, 404B and 404C. The length and orientations of sides 403A, 403B, 403C and 404A, 404B and 404C are such that when air bearing slider 200 is mounted on mounting pad 460, the corners 221, 222, 224 and 226 of the air bearing slider overlap load beam surround portions 403 and 404. This overlap is illustrated in FIG. 4E.

Figure 4E:
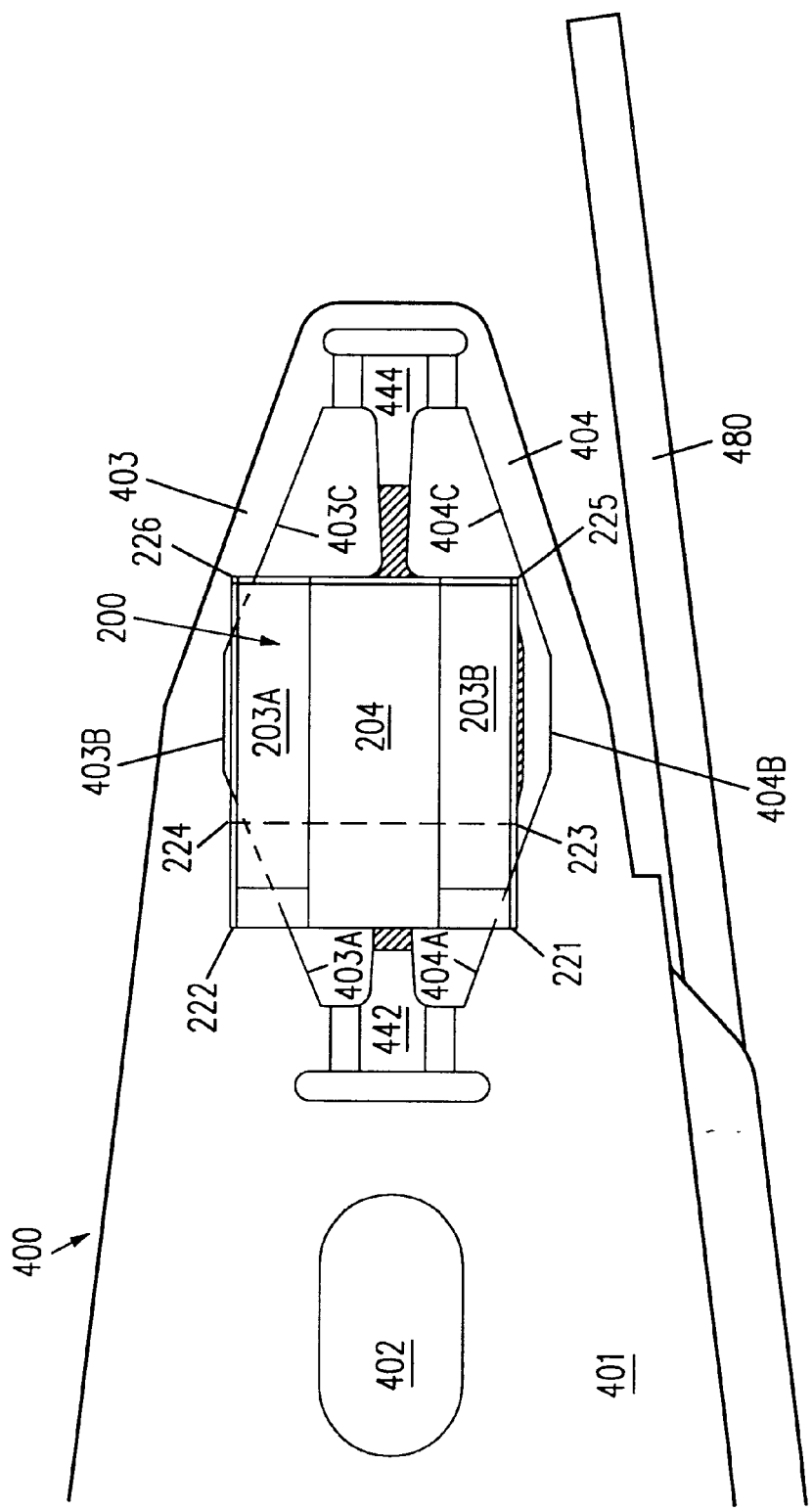
FIG. 4E is a plan view of the air bearing slider of FIG. 2A mounted on the suspension of FIG. 4A.

The shape and configuration of load beam surround portions 403 and 404 are such that when air bearing slider 200 is mounted on suspension 400, the Z-axis travel is constrained at corners 224 and 226 by load beam surround portion 403 (FIG. 4E). Mounting pad 460 has a H shaped adhesive reservoir 468 (not shown in FIG. 4B) used to attached adherent surface 211 of air bearing slider 200 to mounting pad 460. An "H" shaped adhesive reservoir is, however, illustrated in FIGS. 4A, 5A and 6A.

Control of the depth of notch surface 212, thickness of flexure area 410 and length of pitch elements 454 and 456 allows optimization of pitch and roll stiffness while still maintaining angular excursion limits. The pitch and roll stiffness for an air bearing slider 200 mounted on suspension 400 (FIG. 4E) are compared with those for the prior art configuration in Table 1 listed below:

TABLE 1

| Slider/Suspension | Pitch | Roll |
| --- | --- | --- |
| Prior Art Type 1650 | 9.6 $\mu$Nmm/deg | 4.4 $\mu$Nmm/deg |
| Prior Art Type 1650 LS | 5.7 $\mu$Nmm/deg | 2.6 $\mu$Nmm/deg |
| Slider 200/Suspension 400 (FIG. 4E) | 2.5 $\mu$Nmm/deg | 2.1 $\mu$Nmm/deg |

Figure 4F:
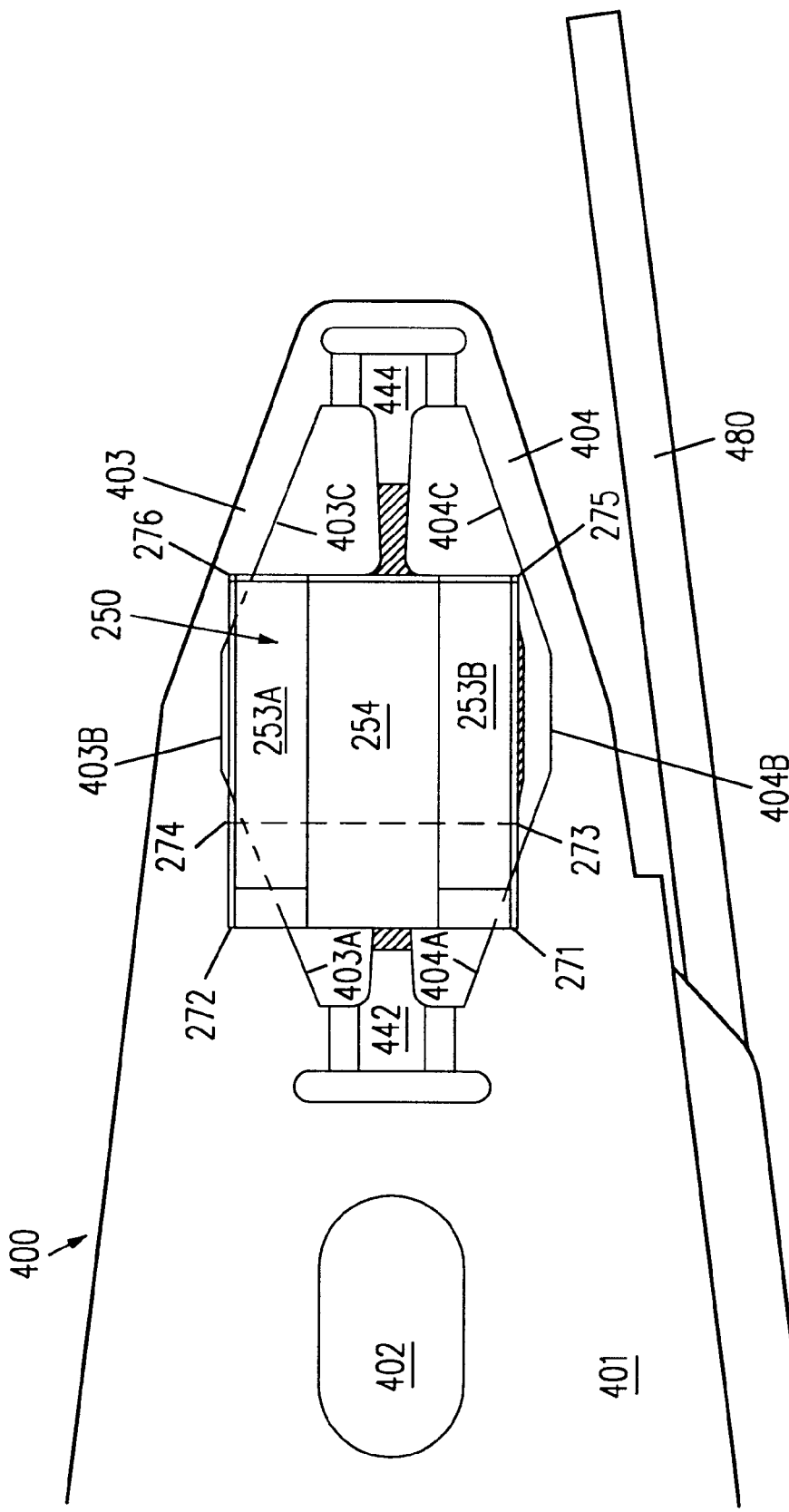
FIG. 4F is a plan view of the air bearing slider of FIG. 2E mounted on the suspension of FIG. 4A.

FIG. 4F illustrates air bearing slider 250 mounted on suspension 400 of FIG. 4A. Air bearing slider 250 overlaps load beam surround portions 403 and 404 while providing a clearance in a manner similar to that described above for air bearing slider 200.

Low pitch and roll stiffness of a relieved air bearing slider mounted on suspension 400 (FIGS. 4E and 4F) improve the capability of the air bearing slider to adjust from initial "static" angle while unloaded to the flying pitch and roll during a dynamic load. When unloaded (i.e. at their static angles), the air bearing sliders may typically have pitch and roll angle orientations of thousands of microinches. In contrast, when the air bearing sliders are loaded (flying above the surface of the disk), the pitch angle is typically 6 microinches and the roll angle is a few tenths of a microinch.

The lower the pitch and roll stiffness, the quicker an air bearing slider can transition from the "static" angle to the flying angle because the lower pitch and roll stiffness translate into smaller forces required to reach the desired flying angle. These smaller forces are present above the disk surface earlier during the establishment of the air bearing. Therefore, lower pitch and roll stiffness allow either a wider range of Z-axis velocities during dynamic loads or a wider range of allowable static pitch and roll angles. It is desirable to keep the pitch and roll static angle requirement as wide as possible so that no special processes or inspections are required in production. It is also desirable to keep a wide range of allowable load velocities, since this makes implementing the drive's velocity control system easier.

Low pitch and roll stiffness also improve the flying height distribution of air bearing sliders. The "static" angle of an unloaded air bearing slider is not uniform. The nonuniform static angle of the air bearing sliders results from factors such as handling and attachment position differences at the air bearing sliders to their respective flexure gimbals. The "static" angle times the stiffness (pitch or roll) is equivalent to a moment applied to an air bearing slider while flying. If the static angle is large and the stiffness great, resulting in a large moment, it may not be possible to bring the flying pitch and roll angles to the desired magnitudes. Therefore lower pitch and roll stiffness result in a smaller moment, and all air bearing sliders in accordance with this invention can be brought to a uniform flying height.

However, when pitch and roll stiffness are reduced, stiffness in the Z-direction is also reduced which allows air bearing slider 400 to contact load beam surround regions 403 and 404 at the corner points 224 and 226 (as described above), especially under Z-axis operational shock loads.

FIG. 5A is an illustrative plan view of a suspension 500 in accordance with this invention. Suspension 500 is similar to suspension 400 described above. Suspension 500 includes lift rod 580, and load beam 501 with load beam window 502, flexure slots 512 and 514, sloping supports 532, 534, 536 and 538, roll elements 542 and 544, gimbal element 550, mounting pad windows 526 and 528, and mounting pad 560 with adhesive reservoir 568. However, load beam surround portions 503 and 504 differ from load beam surround portions 403 and 404 in the following manner. Load beam surround portions 503 and 504 are provided with etched regions 570 and 580 respectively. Etched region 570 has sides 572, 576 and 579 interior to load beam surround portion 503 and shares inner periphery 503I of load beam surround portion 503.

As shown in FIG. 5E, etched region 570 has a thickness $t_E$ which is formed by etching a load beam of thickness $t_L$ by a depth $d_E=t_L-t_E$. Referring to FIG. 5C, sides 572, 576 and 579 of etched region 570 are chosen in such manner that when an air bearing slider 170 is mounted on suspension 500, etched region 570 is larger than the overlap between air bearing slider 170 and load beam surround portion 503. Sides 572 and 579 are separated by a distance $L_E$ which is larger than length $L_S$ of air bearing slider 170 by an amount=0.05 to 0.08 mm. Therefore, corners 184 and 188 of air bearing slider 170 fall in the interior of etched region 570 adjacent to corners 574 and 578 of etched region 570.

In a similar manner, etched region 580 of beam surround portion 504 has sides 582, 586, 589 and shares inner periphery 504I of load beam surround portion 504. Sides 582 and 589 are separated by a distance $L_E$ which is larger than air bearing slider length $L_S$. Also in a similar manner, corners 186 and 180 of air bearing slider 170 fall in the interior of etched region 580 adjacent to corners 584 and 588 of etched region 580.

Furthermore, sides 576 and 586 of etched regions 570 and 580 are located at a distance $W_L$ from each other such that air bearing slider width $W_S$ is smaller than $W_L$. Therefore the two steps of (1) mounting air bearing slider 170 and (2) etching load beam surround portions 503 and 504 are such that all overlapping portions of air bearing slider 170 are bounded entirely by etched regions 570 and 580 of suspension 500.

Clearance $C_{AZ}$ between mounting side 172 of air bearing slider 170 and roll element 542 of suspension 500 in region 182 is at least equal to the prior art air bearing slider flexure clearance. However the clearance between corners 184, 186, 188 and 180 and suspension 500 is $C_{SEL}$ which is greater than $C_{AZ}$ by etched depth $d_E=0.050$ mm (FIG. 5E).

Therefore, in one embodiment of a head suspension in accordance with the invention, there is an etched region (such as one of etched regions 570 and 580) in the load beam surround portion (such as one of load beam surround portions 503 and 504) in the area covered by an air bearing slider.

Head suspension 500 eliminates interference between load beam surround portions 503 and 504 and air bearing slider 170 during operating shock. Depth $d_E$ of etched regions 570 and 580 of load beam surround portions 503 and 504 can be easily altered during etching. One advantage of the current design of etching load beam surround portions 503 and 504 is that the suspension remains symmetrical which reduces possible suspension resonance. Furthermore, under very high non-operational shocks, crash stop impact, or handling during manufacturing, over-travel by air bearing slider 170 is constrained because air bearing slider 170 will contact suspension 500 in the etched region after moving the extra clearance amount provided by etched depth $d_E=0.050$. Limiting the air bearing slider's over-travel in this way prevents permanent deformation.

Although suspension 500 is illustrated in connection with prior art air bearing slider 170, it will of course be appreciated that suspension 500 may advantageously be used with a relieved air bearing slider. FIGS. 5F, 5G and 5H are plan view, cross-sectional view and enlarged view of air bearing slider 200 of FIG. 2A mounted on suspension 500 of FIG. 5A. The clearance $C_{NF}$ between mounting side 202 of air bearing slider 200 and roll element 542 of suspension 500 in the region 228 is greater than similar clearance $C_{AZ}$ by the amount of notch depth $d_N$. Moreover, the clearance between corners 221, 222, 226 and 225 and suspension 500 is $C_{NEL}$ which is also greater than similar clearance $C_{SEL}$ by the amount of notch depth $d_N$. Similarly FIGS. 5I, 5J and 5K are plan view, cross-sectional view and enlarged view of air bearing slider 250 of FIG. 2E mounted on suspension 500 of FIG. 5A. The clearance $C_{TF}$ between mounting side 252 and roll element 542 is identical to $C_{NF}$ described above. Clearance $C_{TEL}$ between corners 271, 272, 276 and 275 and suspension 500 is also identical to $C_{NEL}$ described above. The combination of a relieved air bearing slider with suspension 500 allows less area of load beam surround portions 503 and 504 to be etched since a relieved air bearing slider includes a relieved portion (such as a stepped-contour or a tapered contour) which provides additional clearance.

FIG. 6A is an illustrative plan view of a suspension 600 in accordance with this invention. Suspension 600 is similar to suspension 400 described above. Suspension 600 includes load beam 601 with load beam window 602, flexure slots 612 and 614, sloping supports 632, 634, 636 and 638, roll elements 642 and 644, gimbal element 650, mounting pad windows 626 and 628, and mounting pad 660 with adhesive reservoir 668.

However, load beam surround portions 603 and 604 differ from load beam surround portions 403 and 404 in the following manner. Load beam surround portions 603 and 604 are provided with unique cutouts in inner peripheries 603I and 604I to eliminate any potential contact between corners 223, 224, 225 and 226 of adherent surface 211 of air bearing slider 200 and load beam surround portions 603 and 604. Inner peripheries 603I and 604I are formed in such a manner as to avoid overlap with adherent surface 211 or 261 of air bearing slider 200 or 250 when air bearing slider 200 or 250 is mounted on mounting pad 660 (FIGS. 6C, 6D, 6E, 6F, 6G and 6H). The cutouts are such that adherent surface 211 or 261 can easily clear load beam surround portions 603 and 604 during Z-axis motion of air bearing slider 200 or 250. Therefore the periphery of adherent surface 211 or 261 to smaller than inner peripheries 603I and 604I.

Inner periphery 603I includes sides 603A, 603B, 603C, 603D and 603E (FIG. 6A). Sides 603B and 603D are located at a distance larger than the length $l_A$ of adherent surface 211 or 261 of air bearing slider 200 or 250 (FIG. 2B or 2G). Moreover, inner periphery 604I (FIG. 6A) includes sides 604A, 604B, 604C and a notch at point 604D on side 604C. The distance between side 604B and side 603C at point 604D is larger than width W of air bearing slider 200 or 250 (see FIG. 2D or 2H).

As shown in FIG. 6C, corners 223, 224, 225 and 226 of air bearing slider 200 avoid overlapping the load beam surround portions 603 and 604. Therefore adherent surface 211 of air bearing slider 200 can travel freely along the Z-axis without any constraint from load beam surround portions 603 and 604. Adherent surface 261 of air bearing slider 250 can also travel freely along the Z-axis in a similar manner (FIG. 6F).

However, air bearing sliders 200 and 250 do overlap load beam surround portions 603 and 604 over the recessed portion such as notch surface 212 and taper surface 262. For example, corners 221 and 222 of air bearing slider 200 will contact load beam surround portions 603 and 604 if the Z-axis movement of air bearing slider 200 is larger than clearance $C_{NL}$. The overlaps over notch surface 212 are deliberately provided to limit angular excursion of air bearing slider 200 when air bearing slider 200 is unloaded from a disk (see FIG. 3C). Similar overlaps over taper surface 262 limit angular excursion of air bearing slider 250 during unloading.

The cutouts to load beam surround portions 603 and 604 of suspension 600 are easily formed using an etching process by generating new etch artwork.

Using a relieved air bearing slider with suspension 600 having both convex-concave periphery mounting pad and cutout load beam surround portions allows pitch and roll stiffness to be reduced significantly while simultaneously providing angular limit stops for non-operational shock loads. The simplicity of manufacturing a suspension using etching and a notched air bearing slider using grinding permits a wide range of design parameters to be accommodated and yet yield desired low stiffness.

Although the present invention has been described in connection with the above described illustrative embodiments, the present invention is not limited thereto. For example, although in FIGS. 6C and 6D, air bearing slider 200 is shown mounted on suspension 600, a prior art air bearing slider can be mounted on suspension 600. Various modifications and adaptations of the above discussed embodiment are encompassed by this invention as set forth in the appended claims.

What is claimed is:

1. A head suspension comprising a load beam and a flexure, said flexure comprising a mounting pad and an annular gimbal element, said gimbal element surrounding said mounting pad, said gimbal element being connected to said mounting pad by at least two pitch elements, wherein:

at least one of said pitch elements has a length greater than one third of the length of said mounting pad;

said gimbal element has an inner periphery connected only to said pitch elements;

said mounting pad is located between said pitch elements;

said flexure farther comprises at least two roll elements located along a first axis, said first axis being at least substantially perpendicular to another axis passing through said pitch elements and a central region of said mounting pad, each of said roll elements connecting a portion of said gimbal element to a portion of said load beam, each of said roll elements having a length greater than the length of said at least one of said pitch elements; and wherein said mounting pad comprises a periphery having a first periphery portion and a second periphery portion, said first periphery portion being unconnected, said first periphery portion being separated from said gimbal element inner periphery by a first distance, said second periphery portion being connected to one of said pitch elements, said second periphery portion being separated from said gimbal element inner periphery by a second distance, said second distance being larger than said first distance.

2. The head suspension of claim 1 wherein said head suspension is unitary, said load beam and said flexure are formed from a single piece of sheet material.

3. The head suspension of claim 1 wherein said load beam comprises a first load beam surround portion and a second load beam surround portion, said gimbal element being surrounded by said first load beam surround portion and said second load beam surround portion.

4. The head suspension of claim 3 wherein each of said pitch elements has a thickness less than a thickness of one of said first and second load beam surround portions.

5. The head suspension of claim 3 wherein said gimbal element has a thickness less than a thickness of one of said first and second load beam surround portions.

6. The apparatus of claim 1 wherein said mounting pad defines an adhesive reservoir.

7. The head suspension of claim 6 wherein said adhesive reservoir is H shaped.

* * * * *